US012304754B2

(12) United States Patent
Garriott et al.

(10) Patent No.: US 12,304,754 B2
(45) Date of Patent: May 20, 2025

(54) METHOD AND APPARATUS FOR BUILDING PALLETED GOODS

(71) Applicant: MacLean Mallard, L.L.C., Mundelein, IL (US)

(72) Inventors: Scott Garriott, Sterling, IL (US); Anthony Wade, Prophetstown, IL (US); Charles R. Gorman, Prophetstown, IL (US)

(73) Assignee: MacLean Mallard, L.L.C., Mundelein, IL (US)

( * ) Notice: Subject to any disclaimer, the term of this patent is extended or adjusted under 35 U.S.C. 154(b) by 0 days.

(21) Appl. No.: 18/483,072

(22) Filed: Oct. 9, 2023

(65) Prior Publication Data

US 2024/0308788 A1 Sep. 19, 2024

Related U.S. Application Data

(60) Provisional application No. 63/490,820, filed on Mar. 17, 2023.

(51) Int. Cl.
B65G 57/03 (2006.01)
B65G 1/08 (2006.01)
B66F 9/06 (2006.01)
B66F 9/18 (2006.01)

(52) U.S. Cl.
CPC .............. B65G 57/03 (2013.01); B65G 1/08 (2013.01); B66F 9/06 (2013.01); B66F 9/18 (2013.01); B65G 2203/0266 (2013.01)

(58) Field of Classification Search
CPC .. B65G 57/03; B65G 1/08; B65G 2203/0266; B65G 61/00; B65G 2209/08; B65G 57/24; B66F 9/06; B66F 9/18
See application file for complete search history.

(56) References Cited

U.S. PATENT DOCUMENTS

| 6,435,328 | B1 * | 8/2002 | Hammond | B65G 1/08 193/35 SS |
| 10,518,973 | B2 * | 12/2019 | Hance | B25J 5/007 |
| 2006/0104752 | A1 * | 5/2006 | Ludwig | B65G 47/8823 414/222.02 |
| 2010/0068027 | A1 * | 3/2010 | Mitchell | B65G 61/00 414/789.9 |

FOREIGN PATENT DOCUMENTS

JP S6413331 A * 1/1989 ............. B65G 57/03

* cited by examiner

Primary Examiner — Gregory W Adams
(74) Attorney, Agent, or Firm — Reinhart Boerner Van Deuren P.C.

(57) ABSTRACT

A pallet build system and method for building custom palleted built order of goods (e.g. mixed SKU/rainbow pallets) is provided. The system comprises forward lanes for stock goods as a supply of goods used for building custom orders of goods on pallets in reverse lanes. Lanes have gravitational feed conveyors. Remote control from a lift vehicle is provided to release custom built pallets once an order is completed.

27 Claims, 11 Drawing Sheets

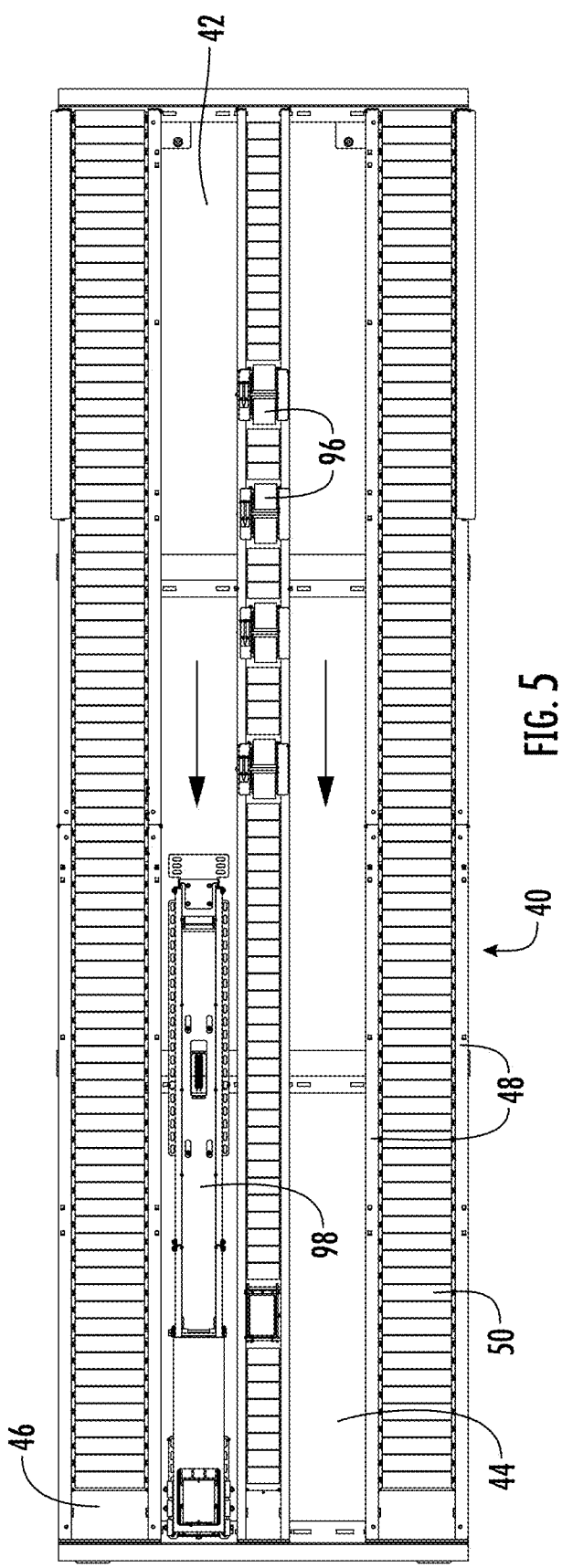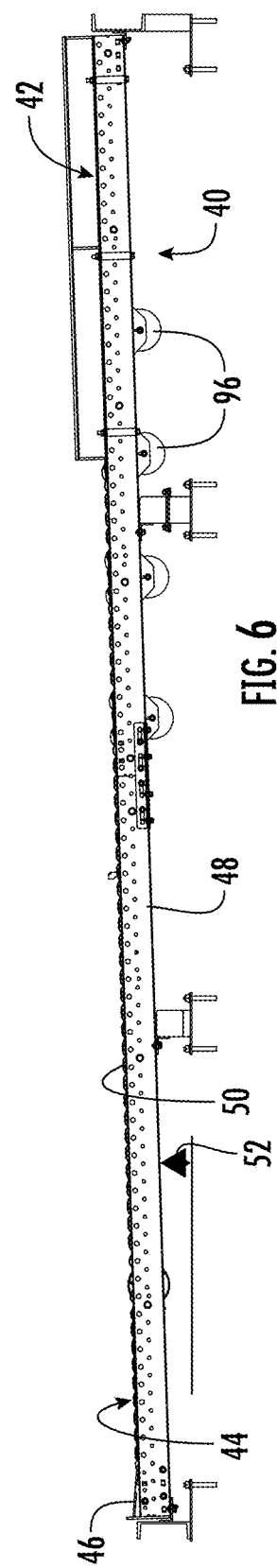
FIG. 5
FIG. 6

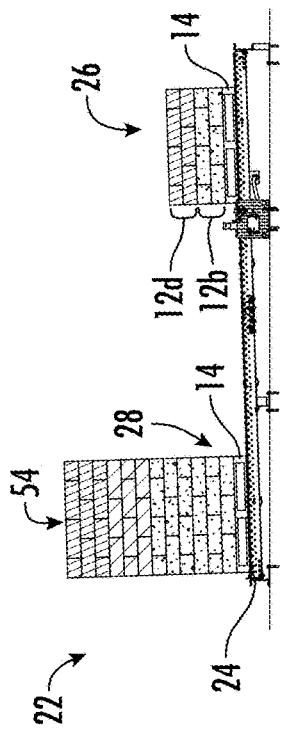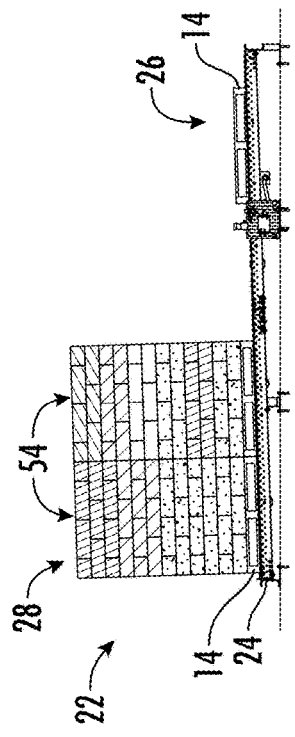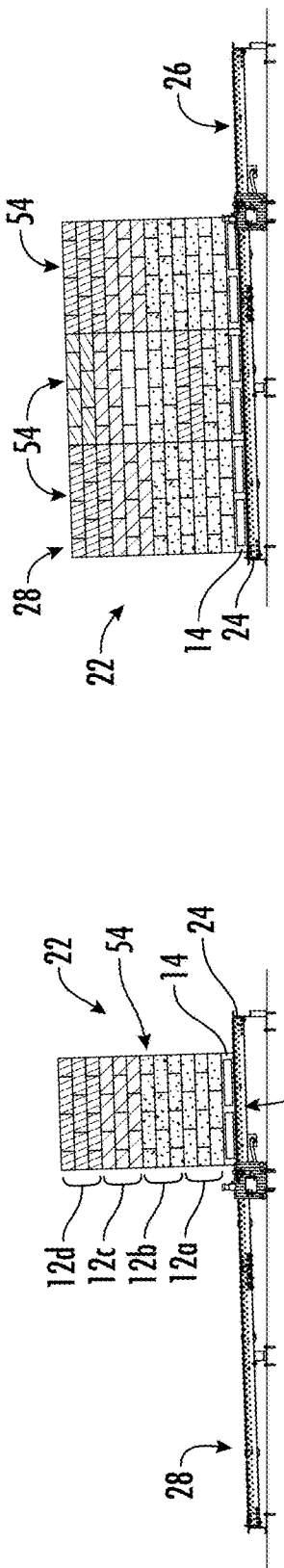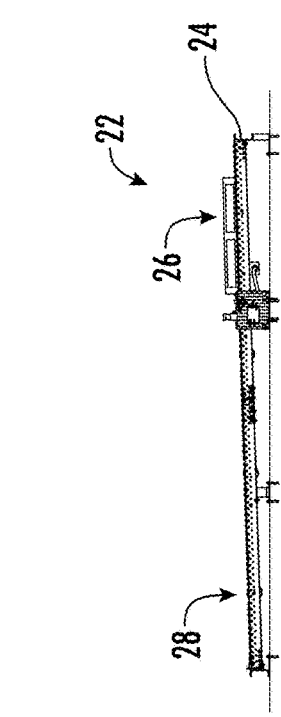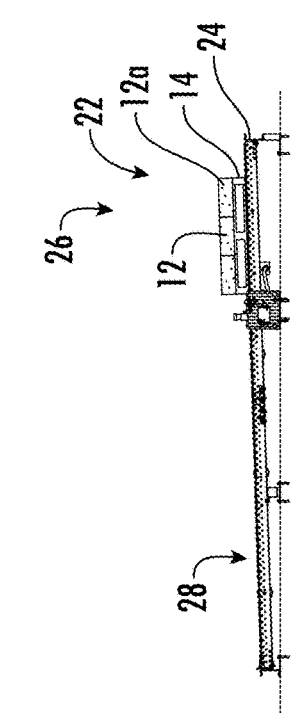

METHOD AND APPARATUS FOR BUILDING PALLETED GOODS

CROSS-REFERENCE TO RELATED PATENT APPLICATIONS

This patent application claims the benefit of U.S. Provisional Patent Application No. 63/490,820, filed Mar. 17, 2023, the entire teachings and disclosure of which are incorporated herein by reference thereto.

FIELD OF THE INVENTION

This invention generally relates to palleted goods and more specifically to methods and conveyor systems in relation to building palleted goods.

BACKGROUND OF THE INVENTION

Unique product codes are used for inventory management. For example, one unique product code is known as a "stock keeping unit" (abbreviated and commonly known as "SKU"). SKUs are units of measure in which the stocks of goods are managed. In other words, an SKU is a distinct type of item for sale, purchased, or tracked in inventory, such as a product or service, and the attributes associated with the item type that distinguish it from other item types (for a product, these attributes can include manufacturer, description, material, color, size, packaging, and warranty terms). When a business records the inventory of its stock, it counts the quantity it has of each unit, or SKU.

SKU may also refer to a unique product identifier code, sometimes represented via a barcode for scanning and tracking, which refers to the particular stock keeping unit. SKUs identifiers are not regulated or standardized. When a company receives items from a vendor, it has a choice of maintaining the vendor's SKU or creating its own. While the apparatus/methods discussed herein are most commonly employed in associate with SKU's, they can also be employed with other similar unique product codes such as: Global Trade Item Number (GTIN), which are standard, global, tracking units; Universal Product Code (UPC), European Article Number (EAN), and the like.

In warehouses and factories, produced goods are often stored on pallets to allow ready transport via lift vehicles (e.g. lift trucks, forklifts, pallet jacks and the like). As will be appreciated, it is most efficient to produce a common pallet of goods at a time.

As an example, in the soda industry, among other products, it is common for there be pallets of lemon-lime soda, pallets of root beer, pallets of cola, and pallets of diet soda. Inventory management of these goods becomes important. In particular, different customers may purchase a mixed combination of goods. For example, a convenience store may want some cases of each of lemon-lime soda, root beer, cola, and diet soda; but not an entire pallet of one of these products. Rather than send a separate pallet for each that may be a single or double layer thick, it is more common to build a "mixed SKU" pallet (a mixed good pallet is often referred to as "rainbow pallet") on the floor a warehouse/factory using a lift vehicle, so that a single pallet containing one or more partial/complete layers of each of lemon-lime soda, root beer, cola, and diet soda in different layers of the pallet are accomplished. In this manner, a single pallet may then be delivered to the customer with different goods of different unique product codes thereon. Currently the build process is inefficient and may be considered disorganized.

Accordingly, the present disclosure and embodiments herein provide different and new solutions to inventory management, that are particularly beneficial for building goods on pallets. These and other advantages of the invention, as well as additional inventive features, will be apparent from the description of the invention provided herein.

BRIEF SUMMARY OF THE INVENTION

One aspect of the present invention is directed toward a method for building palleted goods, comprising: (a) placing and holding a pallet (i.e., one or more pallets) at a build position of a conveyor; (b) stacking goods on the pallet at the build position; (c) releasing the pallet from the build position with the stacked goods thereon; (d) conveying the pallet on the conveyor with the stacked goods thereon to a pick position; and (e) picking the pallet with the stacked goods thereon from the pick position.

The method may feature a plurality of conveyor lanes, with the conveyor lanes located on at least one side of an aisle. The conveyor lanes can include forward lanes and at least one reverse lane, each reverse lane comprising one of said conveyor. The method may then further comprise: (a) transporting stock goods toward the aisle in the forward lanes to stock grab positions; (b) selecting stock goods from the stock grab positions to use for said stacking to form the stacked goods on the pallet while in the build position; and (c) transporting the stacked goods away from the aisle toward the pick position.

Preferably, conveyor lanes are located on both sides of the aisle. In either case of lanes on one or more sides, the method can feature operating a lift vehicle in the aisle.

In some embodiments, one reverse lane is provided, but more typically at least two reverse lanes are provided, in which case the method can further feature: (a) operating a lift vehicle in the aisle to select and move goods from the forward lanes to the reverse lanes; and (b) remotely controlling from the lift vehicle said releasing on the at least two reverse lanes with a remote controller.

The remote-control feature may also comprise enabling the remote controller for only one of the reverse lanes at a time depending upon relative proximity of the remote controller to the respective reverse lanes. In the manner, the releasing is only done on one of the reverse lanes at a time to avoid inadvertent release on a different one of the reverse lanes.

The method may further feature gravitation feeding in which wherein each of the conveyor lanes comprises a gravitational feed. The method can thereby further comprise: (a) gravitationally feeding pallets of stock goods in the forward lanes toward the aisle; and (b) gravitationally feeding pallets of stacked goods away from the aisle with the at least one reverse lane.

When the build conveyor is a gravitational feed conveyor, the pick position is vertically below the build position. Typically, a first stop is arranged at the build position and a second stop is arranged at the pick position. With this arrangement, the method can further comprise: (a) keeping the pallet at the build position with the first stop to facilitated said holding of the pallet at the build position; (b) releasing the first stop to facilitate automatic gravitational feeding of the pallet from the build position to the pick position; and (c) stopping the gravitational feeding with the second stop.

A gravitational feed conveyor may comprise a pair of rails and a plurality of rollers extending between the rails. For most applications, the gravitational feed conveyor will extend at an angle relative horizontal of between 3 and 20 degrees between pick position and the build position (more typically between 5 and 10 degrees).

The method is most advantageous in an arrangement involving operating a lift vehicle to provide said stacking goods on the pallet at the build position.

The method can further feature controlling the releasing of pallets from the build position from the lift vehicle. For example, one may operate a remote controller from the lift vehicle to facilitate said controlling said releasing the pallet from the build position.

The method can enable/disable the remote controller based upon location. For example, the method can feature: (a) activating an operability of the remote controller when the lift vehicle is in a proximal position to the conveyor; and (b) deactivating the operability of the remote controller when the lift vehicle is outside of the proximal position.

The method may even further feature signaling whether the lift vehicle is in the proximal position or outside of the proximal position. For example, the signaling can be accomplished by a signal for the conveyor, wherein the signal: (a) provides a first visual indication when in the proximal position; and (b) provides a second visual indication different than the first visual indication when outside of the proximal position.

An example of the remote controller comprises a transmitter located in the lift vehicle. Further, a receiver is in communication with a moveable stop at the build position of the conveyor. The method can further feature wirelessly communicating between the transmitter and the receiver. When an activation signal is received at the receiver, it can activate the moveable stop to facilitate pallet release at the build position.

Although other actuators are possible, a pneumatically operated stop at the build position of the conveyor is preferred. The method may further feature: (a) raising the pneumatically operated stop to hold the pallet at the build position; and (b) lowering the pneumatically operated stop to release the pallet from the build position.

A lift vehicle used for the method can be configured with a clamp layer pick tool, which may clamp and grab one or more layers of stock product to transfer to the build position.

The method can further feature selectively picking goods from a plurality of different stock goods to stack upon the pallet at the build position, with the stock goods located in different stock grab positions spaced away from the build position.

The different stock goods can be on respective pallets on respective stock conveyors.

The method can advantageously allow mixing of products, in which the different stock goods have different product characteristic having respectively different unique codes (e.g. different SKU, UPC or other code). Advantageously the method can thereby further create differently configured rainbow pallets of different goods have respectively different unique codes at the build position.

As aspect of the present invention is also directed toward a pallet build system for stacking goods upon pallets, comprising a plurality of conveyor lanes located on at least one side of an aisle, the conveyor lanes including forward lanes and at least one reverse lane, each conveyor lane adapted to hold at least one of the pallets and the goods thereon that are moveable toward the aisle in the forward lanes and away from the aisle in the at least one reverse lane. Each at least one reverse lane comprises: (a) a conveyor having spaced apart build and pick positions; (b) a stop arranged to hold at least one pallet in the build position, with the stop being operable to allow movement of the at least one pallet on the conveyor from the build position to the pick position.

For example, a control can operate an actuator to release the stop to allow movement of at least one pallet on the conveyor from the build position to the pick position.

Advantageously, conveyor lanes can be located on both sides of the aisle. A lift vehicle can operate in the aisle central to the conveyor lanes.

Complex build systems can be built, with at least three conveyor lanes located a first side of the aisle and at least three conveyor lanes located a second side of the aisle opposite the first side.

The system can employ a lift vehicle operable in the aisle to select and move goods from the forward lanes to the at least one reverse lane.

The system may further comprise a remote controller including a transmitter. The transmitter communicates with a receiver with the transmitter positioned on the lift vehicle and the receiver in communication with the stop at the build conveyor. The remote controller is operable to activate the stop to release at least one pallet at the build position to allow travel toward the pick position.

In more complex arrangements, at least two reverse lanes are provided. The remote controller can be operable to activate respective stops on respective conveyors of the at least two reverse lanes. The pallet build system can further comprise a proximity sensor indicating position of the lift vehicle relative to the reverse lanes. The proximity sensor communicates with the remote controller and/or respective actuator controls for the respective stops in a manner that activates the remote controller for only one of the reverse lanes at a time depending upon relative proximity of the remote controller to the respective reverse lanes. In this manner, only one of the respective stops is released at a time to avoid inadvertent pallet release on different reverse lanes.

A clamp layer pick tool on the lift vehicle can be operable to selectively stack goods on at least one of the pallets in the build position (stratified layers of goods for example).

The build system will most typical more than one lift vehicle to facilitate higher production overall, and thereby can include second lift vehicle spaced from said lift vehicle that is operable to remove one or more pallets of stacked goods from the pick position on the at least one reverse lane. The second lift vehicle may also load stock goods into places to facilitate grabbing by the first lift vehicle.

The build system can advantageously use different stock goods stored on respective pallets on respective stock conveyors in different respective forward lanes. The different stock goods are of different product characteristics having respectively different unique codes. Further the system builds at the build position a rainbow pallet of goods of different product characteristics having respectively different unique codes selected from the different stock goods.

The system can employ gravitational feeding in which the build conveyor of each at least one reverse lane is a gravitational feed conveyor with the pick position disposed below the build position. For example, the gravitational feed conveyor comprises a pair of rails and a plurality of rollers extending between the rails. For example, the gravitational feed conveyor extends at an angle relative horizontal of between 3 and 20 degrees between pick position and the build position (more typically between 5 and 10 degrees).

Similarly, the forward lanes comprise gravitational feed conveyors that extends at an angle relative horizontal of between 3 and 20 degrees (preferably between 5 and 10 degrees), tilted downwardly toward the aisle so as to gravitationally feed pallets toward the aisle.

The system may comprise a control and an actuator. A worker (either on a lift vehicle, at some other remote spot or even at a local non-remote location) can use the control to operate the actuator to switch the stop between a hold state for holding the at least one pallet in the build position and a release state for releasing the at least one pallet from the build position.

The actuator can be driven to raise and lower the stop to (a) a raised position adapted to hold one or more pallets in the build position and (b) a lowered position adapted to allow gravitational feeding of one or more pallets toward the pick position.

In some embodiments, the actuator is a fluid actuator (e.g., pneumatic or hydraulic actuator), with the control switching the actuator between states (for example between different extended and contracted positions). The control can comprise a fluid controller operating a valve to control fluid flow to the fluid actuator in order to raise and lower the stop.

In some embodiment an electrical actuator is directly operating the stop (e.g., the electrical actuator may be a solenoid, servo-motor, or other electrical motor, which may be linear or rotary). In some embodiments, the control including programable logic controller a switching the electrical actuator in order to raise and lower the stop.

The stop may be provided by a lift and/or abutment projection as apparent from the above. However, in some embodiment the stop takes other forms. For example, the stop can be at least driven roller at the build position that engages with the at least one pallet. The at least one driven roller serves as the stop at the build position by acting upon the pallet to hold pallet position and in that an actuator can drive the at least one driven roller in the release state to release the at least one pallet from the build position and hold the at least one driven roller in the hold state to maintain the at least one pallet at the build position.

In other embodiment a mechanical actuator (e.g. lever, pulley, rack pinion/gear) may be employed. The stop may have a normally raised condition maintaining the hold state such as with a weight, spring or the like. A worker at the conveyor can selectively trigger such control (e.g. push a lever) to release the stop, or even a worker in the lift vehicle can do it remotely while in the cab either through location and/or using the vehicle and/or operated forks of the lift vehicle.

The stop can abut a forward facing edge of the at least one pallet or otherwise engage the pallet or at least partially raises the at least one pallet from the conveyor in the hold state.

The pallet build system can further comprise a control with an actuator that can be driven to raise and lower the stop. The stop in a raised position is adapted to hold one or more pallets in the build position and in a lowered position is adapted to allow gravitational feeding of one or more pallets toward the pick position.

The control can comprise a remote controller including a transmitter. The transmitter operable in spaced wireless communication with the actuator to wirelessly operate the stop. The remote controller may be placed in a lift vehicle.

The pallet build system may further comprise a proximity sensor that activates an operability of the remote controller when a lift vehicle is in a proximal position to the conveyor; and that deactivates the operability of the remote controller when the lift vehicle is outside of the proximal position.

The pallet build system can further comprise a visual indicator responsive to the proximity sensor providing an indication when the lift vehicle is in the proximal position, allowing operation of the stop.

Another inventive aspect is directed toward a conveyor apparatus for building goods on a pallet, comprising: (a) a gravity feed conveyor having spaced apart build and pick positions; (b) a stop arranged to hold the pallet in the build position; and (c) a remote controller operable to release the stop to allow movement of the pallet on the conveyor from the build position to the pick position.

The remote controller can be operable in spaced wireless communication with an actuator (e.g. the receiver for the actuator), in which the actuator drives the stop to wirelessly operate the stop.

The actuator is preferably a pneumatic actuator having an activated state lowering the stop to release the pallet from the build position and a deactivated state maintaining the stop in a raised position holding the pallet in the build position (means such as a spring or otherwise may bias the stop to the raised position in the event of power loss).

A proximity sensor may be employed that activates an operability of the remote controller when a lift vehicle is in a proximal position to the conveyor; and deactivates the operability of the remote controller when the lift vehicle is outside of the proximal position.

The conveyor apparatus may further comprise a visual indicator responsive to the proximity sensor providing an indication when the lift vehicle is in the proximal position, allowing operation of the stop.

The conveyor apparatus can be used in connection with (a) a first lift vehicle having a clamp layer pick tool operable to selectively stack goods on one or more pallets in the build position; and (b) a second lift vehicle operable to remove one or more pallets of goods from the pick position.

The conveyor apparatus can be used in connection with different stock goods stored on respective pallets in spaced relation to the gravity feed conveyor, with the different stock goods being of different product characteristics having respectively different unique codes. A rainbow pallet of goods of different product characteristics having respectively different unique codes selected from the different stock goods can be stacked at the build position of the gravity feed conveyor.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 5 and 6 are respective plan and side elevation views of the stock conveyor shown in FIG. 4;

FIGS. 11a-11f show side elevation views of the build conveyor of one of the reverse lanes as shown in FIG. 9, at various stages of building rainbow pallets thereon in sequence, including a pallet loaded into the build position ready to fill an order (FIG. 11a), the pallet loaded with one layer of one type of goods (FIG. 11b), a completed rainbow pallet loaded with layers of different goods (FIG. 11c), the gravitational release of the completed rainbow pallet to the pick position and development of a second rainbow pallet (FIG. 11d), the second pallet now a completed rainbow pallet loaded with layers of different goods and being released from the load position toward the pick position but with the first completed rainbow pallet still in the pick position (FIG. 11e), and a third rainbow pallet completed and released from the load position (FIG. 11f).

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
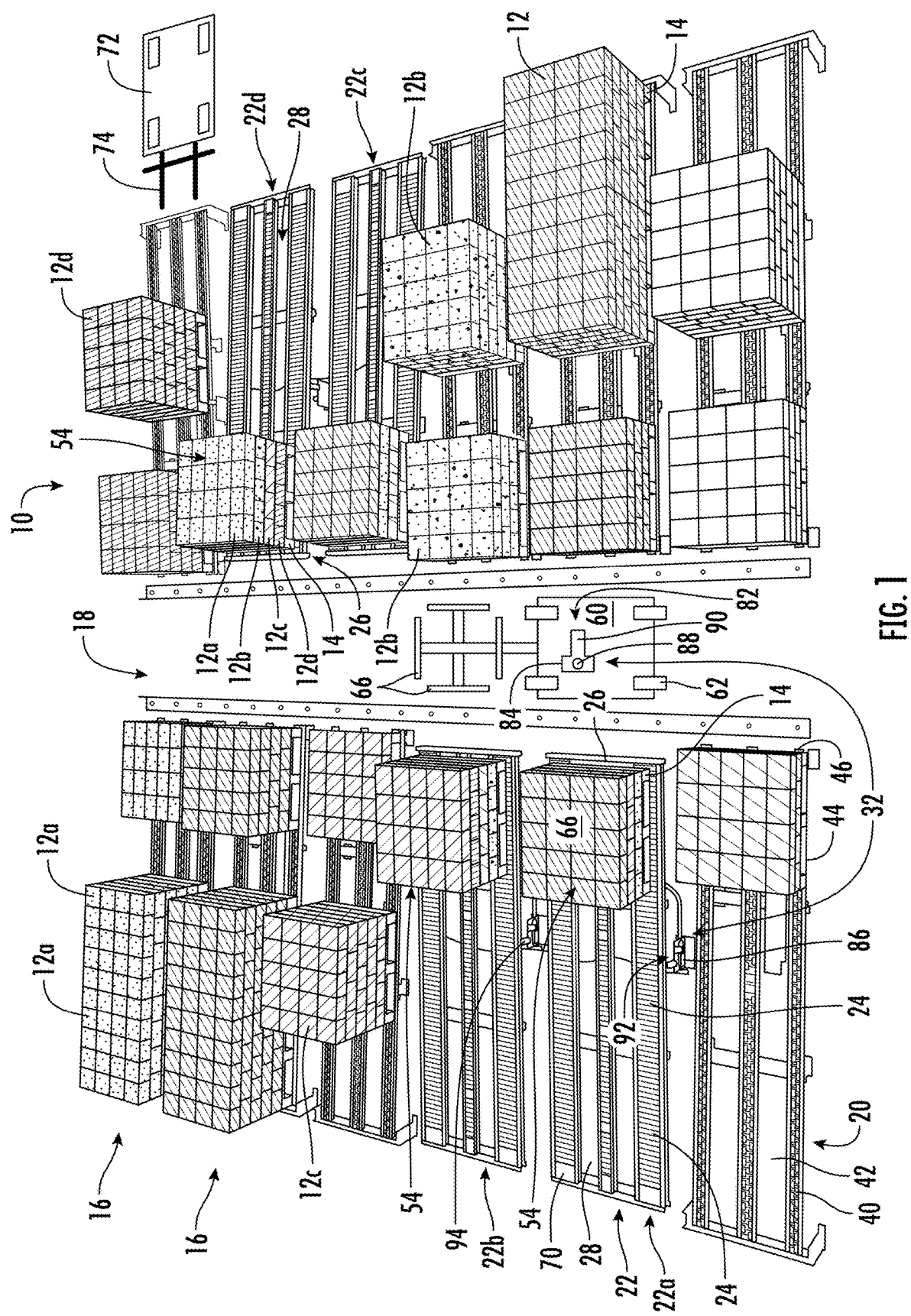
FIG. 1 is a partially schematic, perspective view of a pallet build system with twelve total lanes, and with palleted stock goods and palleted rainbow pallets being created, according to an embodiment of the present invention, with lift vehicles illustrated in schematic form.
Figure 2:
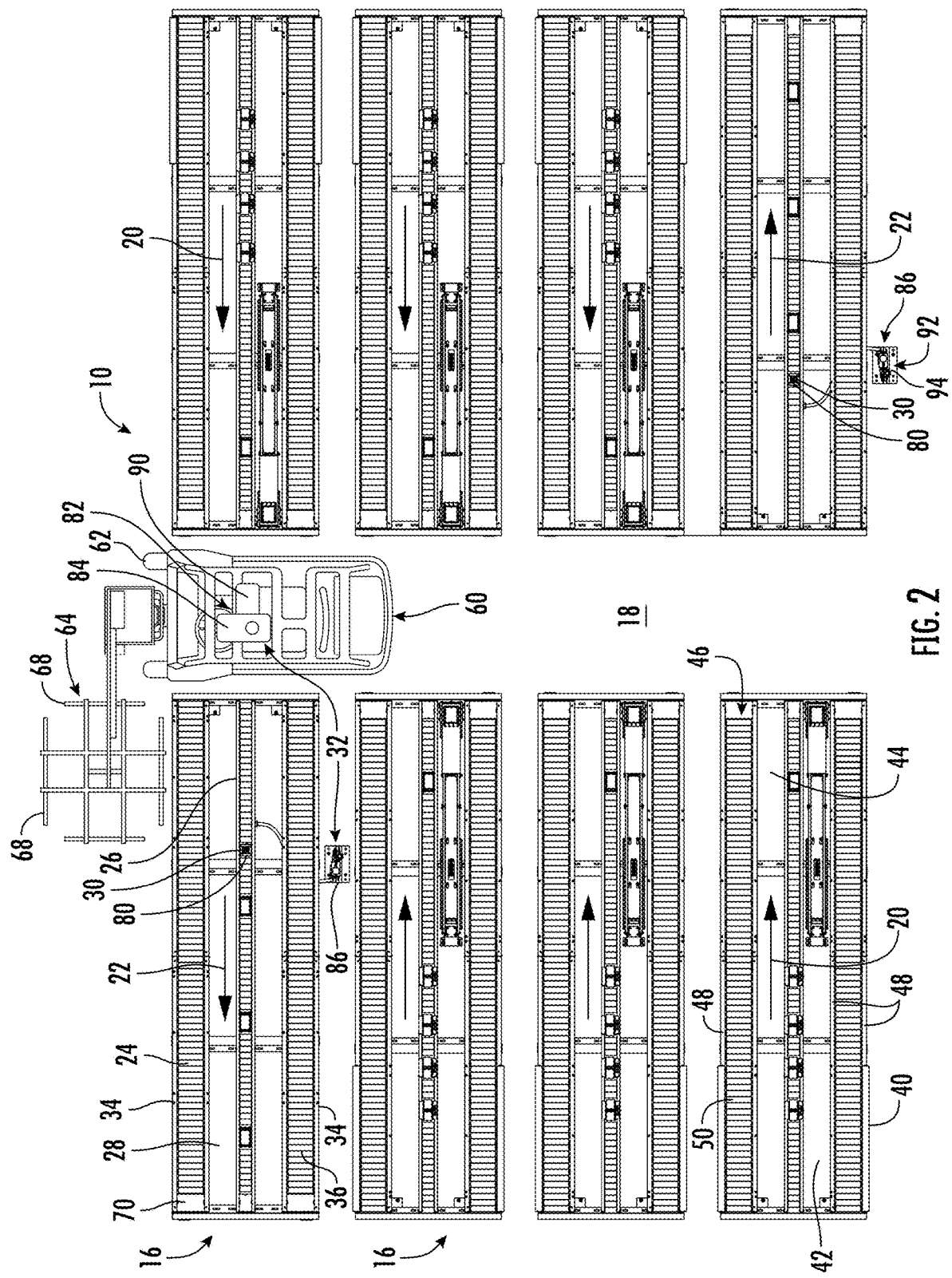
FIG. 2 is a plan view of an embodiment in accordance with the pallet build system shown in FIG. 1 (but with only eight lanes and no goods being shown), it being understood that the description applicable to FIG. 1 also applicable to FIG. 2, and vice versa.
Figure 3:
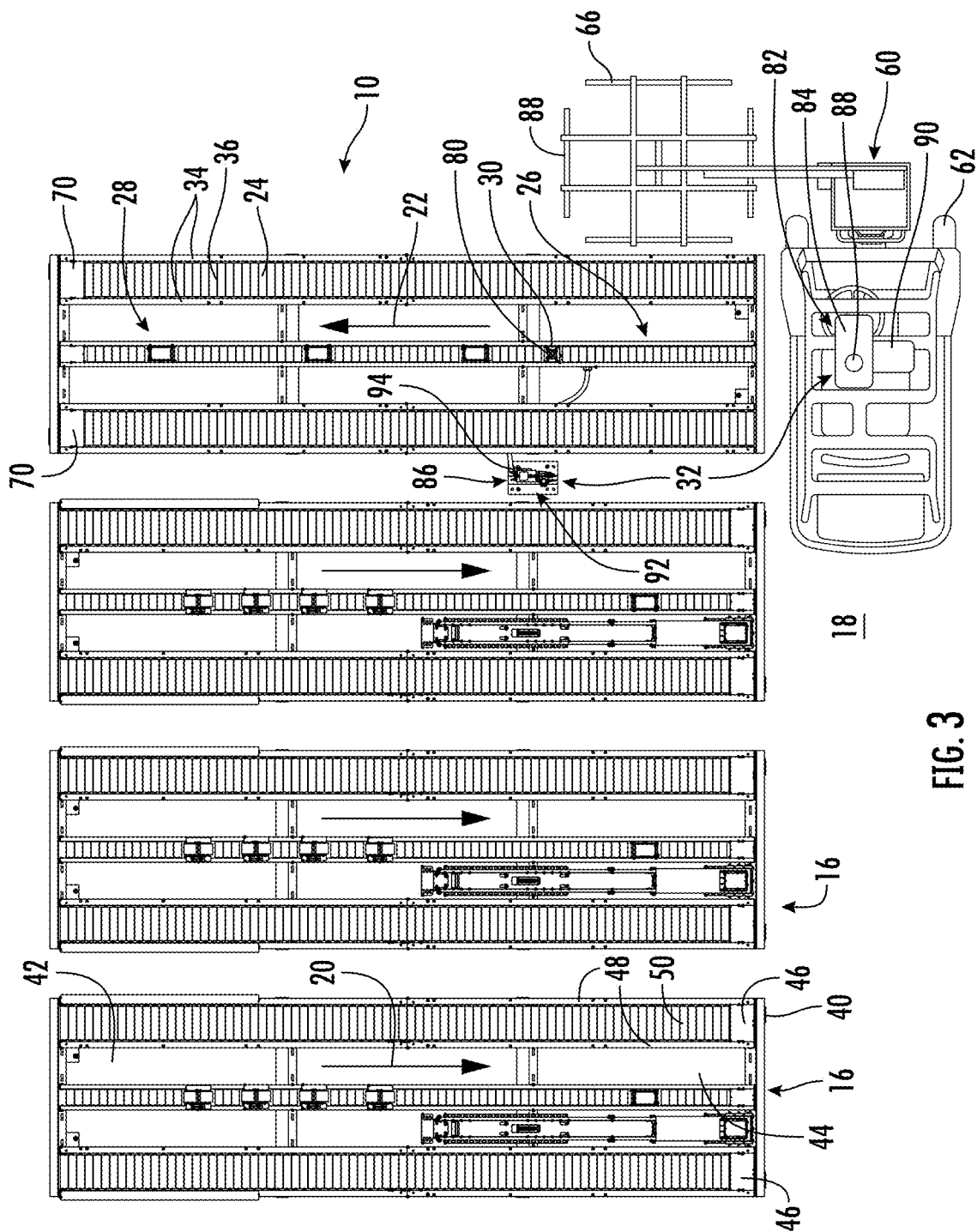
FIG. 3 is an enlarged view of one side of the aisle of lanes of the build system shown in FIG. 2.

In accordance with an embodiment of the present invention, FIGS. 1-3 illustrate a pallet build system 10 for stacking goods 12 upon pallets. The system 10 comprises a plurality of conveyor lanes 16 located on at least one side and more preferably on opposite sides of an aisle 18.

The conveyor lanes 16 including multiple forward lanes 20 and at least one reverse lane 22. Each conveyor lane 16 is adapted to hold at least one of the pallets 14 and the goods 12 thereon with pallets 14 conveyed toward the aisle 18 in the forward lanes 20 and away from the aisle 18 in the at least one reverse lane 22.

For example, in the FIG. 1 embodiment, eight forward lanes 20 and four reverse lanes 22 are illustrated; although it will be appreciated that fewer or more of each can be provided and configured depending upon the inventory management needs. For example, the configuration of FIG. 2 shows only eight lanes total (two reverse lanes 22 and six forward lanes 20, with the reverse lanes preferably at opposite ends, and also preferably on opposite sides of the aisle). In the FIG. 1 embodiment, six lanes are on each side of the aisle 18, and symmetrically arranged for efficiency, however a non-symmetrical arrangement may be done, and there may only be lanes on one side of the aisle 18 (as would be the case as illustrated in FIG. 3).

Each of the reverse lanes 22 comprises a conveyor 24 (may also be referenced as a "build conveyor") having spaced apart build and pick positions 26, 28. Additionally, a stop 30 is arranged to hold the pallets 14 in the build position 26. A control 32 is operable to release the stop 30 to allow movement of pallets 14 on the conveyor 24 from the build position 26 to the pick position 28.

The build conveyor 24 of each reverse lane 22 is preferably a gravitational feed conveyor as shown, with the pick position 28 disposed vertically below the build position 26. In this manner, pallets 14 of goods at the build position 26 when released will automatically travel and be gravitationally conveyed from the build position 26 to the pick position 28 (for example, when the stop 30 is released by the control 32).

Figure 7:
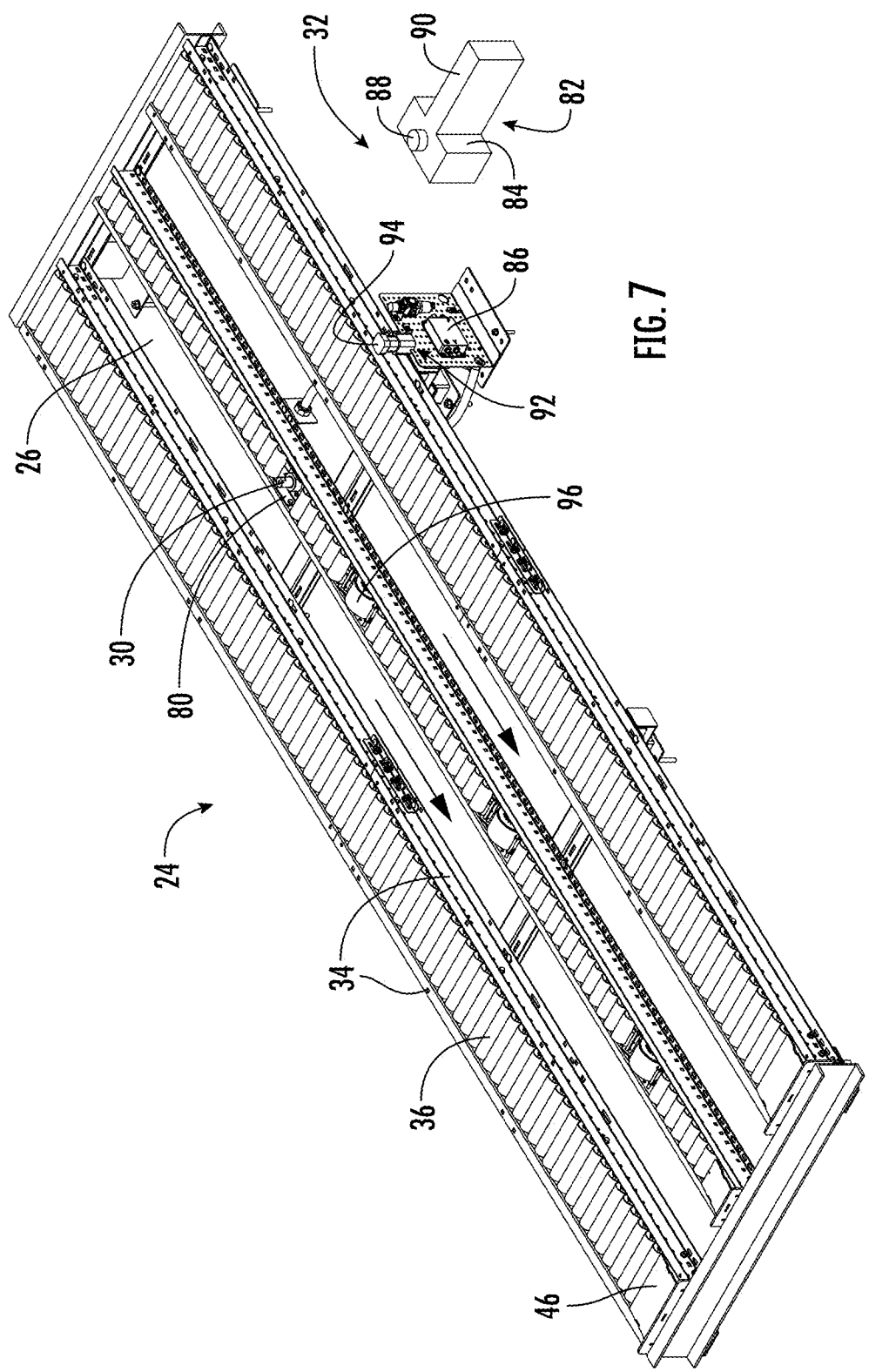
FIG. 7 is an isometric view of the build conveyor of one of the reverse lanes employed in the build system shown in FIG. 2.
Figure 8:
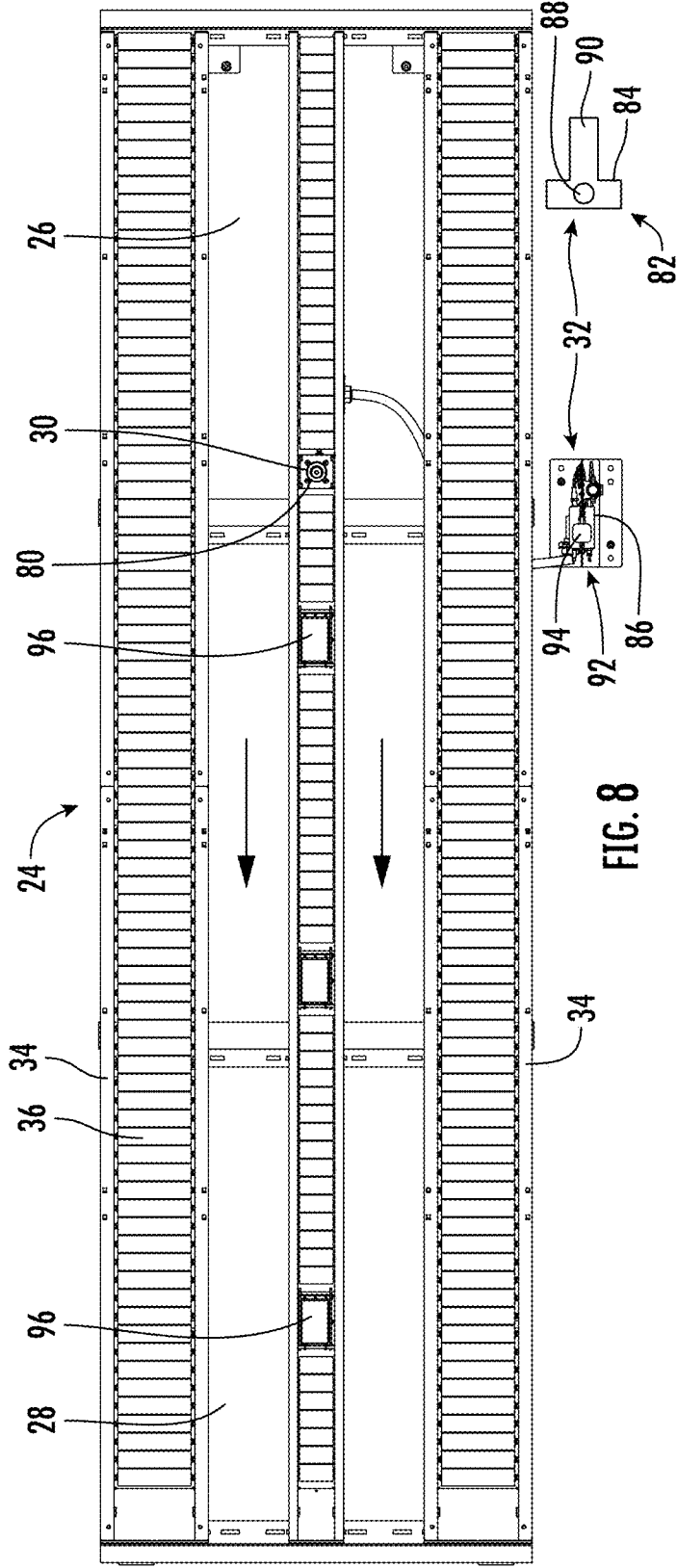
FIGS. 8 and 9 are respective plan and side elevation views of the build conveyor shown in FIG. 7.
Figure 9:
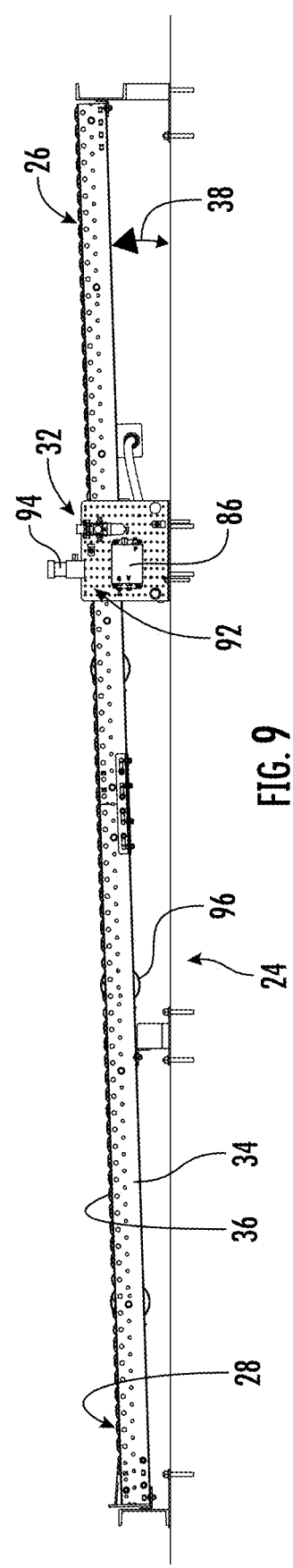

As shown with additional reference to FIGS. 7-9, the gravitational feed, build conveyor 24 in this embodiment comprises rails 34 (e.g. extending in parallel relationship between the build and pick positions 26, 28) and a plurality of rollers 36 supported by the rails 34. The rollers 36 may extend between pairs of the rails 34. The rollers 36 spin freely relative to the rails 34 such that pallets of goods once built can gravitationally be fed and conveyed from the build position 26 to the pick position 28 via rolling action of the rollers.

To facilitate gravitational feeding, the gravitational feed, build conveyor 24 typically extends at an angle 74 (see e.g. FIG. 9) relative horizontal of between 3 and 20 degrees (more typically between 5 and 10 degrees) between pick position 28 and the build position 26. The angle depends upon the anticipated loading weight, friction and type of pallet utilized, so that a slow controlled gravitational movement is accomplished.

Similar to the reverse lanes 22, each of the forward lanes 20 also comprises a conveyor 40 (may also be referred to as a "stock conveyor"), in this case having spaced apart load and stock grab positions 42, 44 for holding stock goods 12 ready for use in building customized pallets at the build conveyor 24. One or more pallets 14 of goods 12 can be stored on the stock conveyors 40 of the various forward lanes 20.

Preferably, as shown in FIG. 1, each forward lane 20 will be utilized for a different type of good with its own unique product code (e.g. SKU), such that different goods 12a, 12b, 12c and 12d maybe stored in different lanes 20 ready for use. Accordingly, different lanes 16 may be used and typically designated for different unique product codes (e.g. SKUs). In this manner, an operator can select which of the different goods 12a, 12b. 12c and 12d are to be removed and placed selectively on a select pallet on the build conveyor 24.

For example, and using cases of soda as an example, cases of lemon-lime soda goods 12a, root beer goods 12b, cola goods 12c, and diet soda 12d are used in this embodiment. As also illustrated more popular used goods such as cola goods 12c or diet soda 12d may also occupy multiple lanes for efficiency and stocking sufficiency. While soda is used as an example, it will be appreciated that this is also applicable to other types of goods such as different types of cereals, beer, pet food, health/beauty pharmaceutical, ice cream and the like to name a few. And this also affords the ability to stack different categories of goods, for example beer could be intermixed with soda or even cereal products over cases of soda for example. In such instances, the inclination of the conveyors are adjusted more or less to have a controlled gravitational conveying movement.

The stock conveyor 40 of each forward lane 20 is also preferably a gravitational feed conveyor as shown, with the stock grab position 44 adjacent to the aisle disposed vertically below the load position 42. In this manner, pallets 14 of goods loaded by an operator (e.g. in a lift vehicle) at the load position 42 will automatically travel and be gravitationally conveyed from the load position 42 to the stock grab position 44. A end stop 46 (typically non-operable permanent stop) is provided at the stock grab position 44 to prevent pallets from sliding into the aisle 18. Optionally, intermediate operable stop mechanisms (e.g. speed retarder/brakes 96 and/or mechanical pallet separators 98) may be provided to space goods on the stock conveyor 40.

Figure 4:
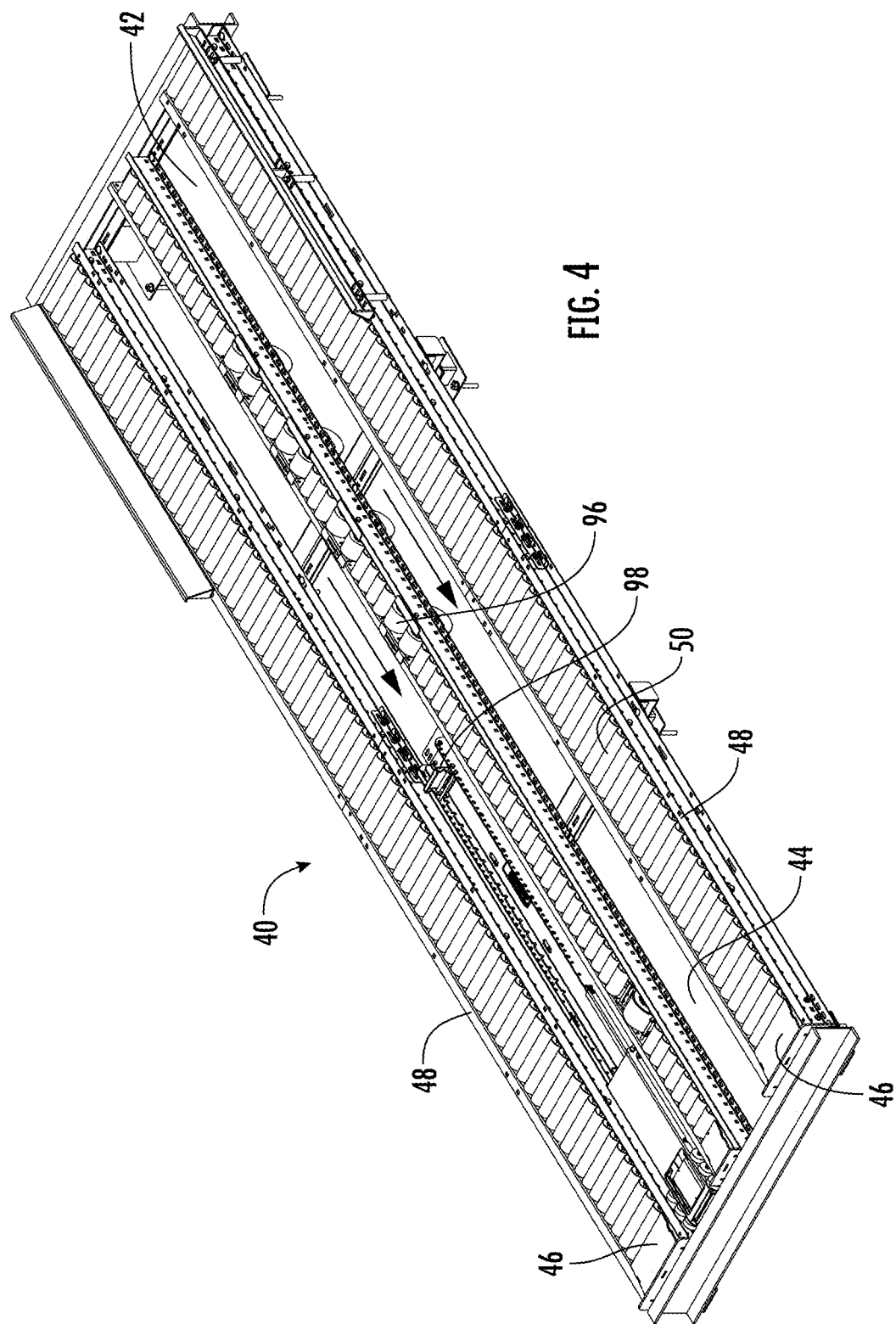
FIG. 4 is an isometric view of the stock conveyor of one of the forward lanes employed in the build system shown in FIG. 2.

With additional reference to FIGS. 4-6, the gravitational feed, stock conveyor 40 in this embodiment comprises rails 48 (e.g. extending in parallel relationship between the load and stock grab positions 42, 44) and a plurality of rollers 50 supported by the rails 48. The rollers 50 may extend between pairs of the rails 48. The rollers 50 spin freely relative to the rails 48 such that pallets of goods can ready flow and convey from the load position 42 to the stock grab position 44 via rolling action of the rollers.

To facilitate gravitational feeding, the gravitational feed, stock conveyor 40 typically extends at an angle relative horizontal of between 3 and 20 degrees (more typically between 5 and 10 degrees) between load and stock grab positions 42, 44, such as shown in FIG. 6.

While gravitational feed type conveyors 24, 40 are most preferred, driven conveyors may alternatively be substituted therefore in either or any of the forward or reverse lanes 20, 22.

Additionally, stock goods may additionally be stored on the factory/warehouse floor surface rather than on stock conveyor for selecting to be stacked onto the build conveyor 24. A stack of empty pallets 12 may also be positioned on the factory/warehouse floor surface, or possibly on one of the conveyors 40 of the forward lanes 20.

To facilitate transfer of goods 12 (and pallets 12 when needed) between the stock conveyors 40 and the one or more build conveyors 24, a lift vehicle 60 operates in the aisle 18. Most typically, the lift vehicle 60 will be operated by a person, however robotic or remotely controlled lift vehicles are also possible.

The lift vehicle 60 typically has wheels 62 to facilitate movement on the warehouse/factory floor, for example forwardly and rearwardly in the aisle 18.

The lift vehicle 60 in this embodiment employs clamp layer pick tool 64 driven by an elevator as part of the lift vehicle such that the clamp pick tool 64 can raise and lower goods 12. The clamp pick tool 64 comprises clamp elements 66 that can be actuated radially inwardly and outwardly to clamp and release one or more of individual layers 66 of goods 12 from select pallets 12 (and/or to grab and place pallets when needed). In this manner, the clamp pick tool 64 can be actuated to remove one or more layers 66 from a position on top of pallets 14 at the stock grab positions 44 of the forward lanes 20, and release the layers 66 onto the pallet 14 at the load position 42 at the build position 26 on the reverse lane(s) 22.

In this manner the lift vehicle operator can select from the available selection of different goods 12a-12d in different forward lanes 20 to build a custom rainbow pallet 54 of goods 12 (e.g. mixed SKU pallet) in order to full a custom order.

In addition to rainbow pallets 54, it also possible with this pallet build system 10 to build a custom pallet of goods to fulfill an order with a select number of a single type of the goods 12a-12d. That way, a customer who only wants less than a full pallet (i.e. a partial pallet) of one type of good 12 can have that order fulfilled as well.

The lift vehicle 60 can travel forwardly and rearwardly in the aisle 18 (and out of the aisle as may be needed) to select and transfer goods 12 from one or more of the forward lanes 20 to the reverse lane(s) 22.

Once a select pallet 14 of goods 12 (e.g. a rainbow pallet 54 or other custom pallet of select number of goods), the control 32 can be operated to facilitate release of pallets 14 from the build position 26. This allows the rainbow pallet 54 (or other custom pallet of select number of goods) to convey toward an end stop 70 that positions it at the pick position 28.

At the pick position 28, a different lift vehicle 72 is provided with a pallet fork 74 that can be raised and lowered. This lift vehicle 72 is operated separately from the first lift vehicle 60, and is operable to pick rainbow pallets 54 (or other custom pallets of select number of goods) from the pick position 28, by placing its pallet fork 74 under the rainbow pallet 54, and lifting the entire pallet of goods 12.

For example, the lift vehicle 72 as shown in FIG. 1 could move to the pick position for the build conveyor 24 shown in FIG. 11d to pick the completed rainbow pallet 54 shown therein. Indeed, an accumulation of rainbow pallets 54 created at the build station and released is shown in FIGS. 11e and 11f, such that three rainbow pallets shown in FIG. 11f are ready to be removed by the lift vehicle 72.

Accordingly, the lift vehicle 60 operating in the aisle 18 is operable to move layers 66 of goods onto one or more pallets at the load position 42, while the lift vehicle 72 operating outside of the aisle 18 is operable to pick and remove rainbow pallets 54 (or other custom pallet of select number of goods) from pick position 28.

The second lift vehicle 72 (and other such lift vehicles outside of the aisle) are also operable to stock fresh pallets 14 of goods 12 onto forward lanes 16 in order to replenish the supply of stock goods that are being consumed by the first lift vehicle 60 operating in the aisle 18 to create custom SKU orders.

Figure 10A:
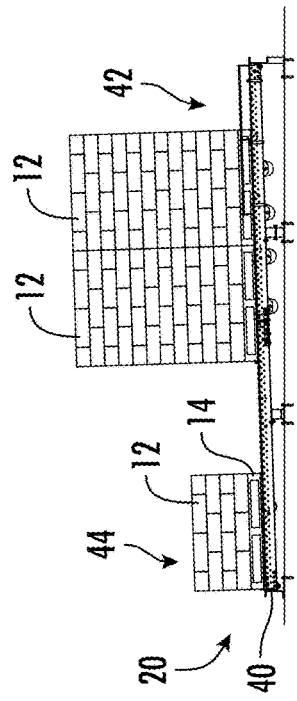
FIGS. 10a-10f show side elevation views of the stock conveyor of one of the forward lanes as shown in FIG. 6 at various stages of stocking in sequence, including one pallet fully loaded with stock goods in the stock grab position (FIG. 10a), additional pallet(s) fully loaded with stock goods in reserve positions that may be spaced by separators on the conveyor (FIGS. 10b, 10c), progressive removal of good from the grab position to be used for building rainbow pallets of goods (FIGS. 10d, 10e), and subsequent completely exhaustion of the stock goods (FIG. 10f)
Figure 10B:
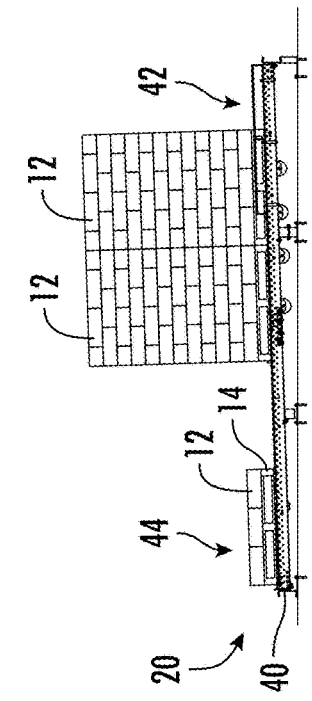
Figure 10D:
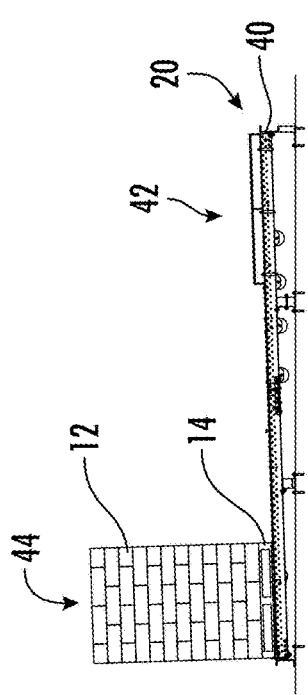
Figure 10E:
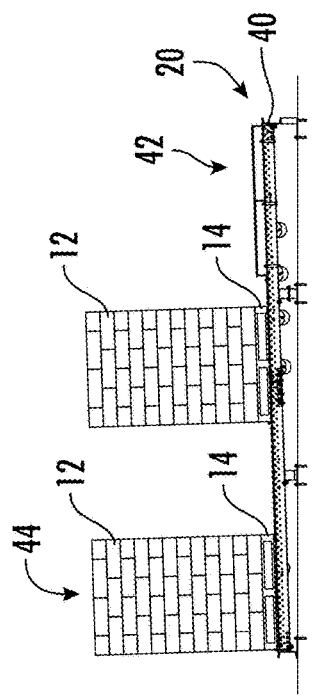
Figure 10C:
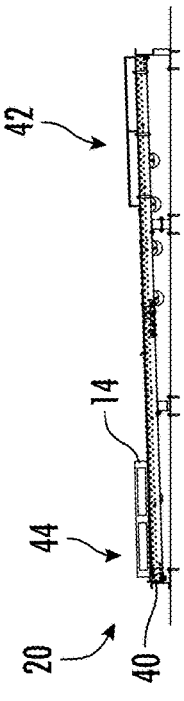
Figure 10F:
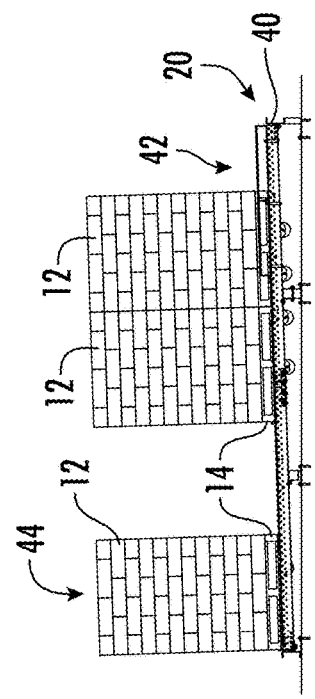

This can be seen with reference to FIGS. 10a-10f, whereby it can be understood that the lift vehicle 72 has added pallets 14 of stock goods 12, which upon loading onto the load position 42 convey automatically via gravity feed toward the stock grab position 44, whereas shown in FIGS. 10e and 10f layers have been removed (e.g. by the aisle operating lift vehicle 60 shown in FIG. 1).

Rainbow pallets 54 (or other custom pallets of select number of goods) are thus removed from the pallet build system 10 and can be transported to customers or other locations as desired.

To facilitate release of rainbow pallets 54 (or other custom pallets of select number of goods), the control 32 may operate an actuator 80 (for example a fluid actuator such as pneumatic cylinder, an electrical actuator such as a solenoid, servo-motor, or other electrical motor, or a mechanical actuator such as a lever, rack and pinon, gear or the like). The control 32 is operable to drive the actuator 80 which is coupled to the stop 30, which effects raising and lowering of the stop 30.

The stop 30 in a raised position is adapted to hold one or more pallets in the build position 26 and in a lowered position adapted to allow gravitational feeding of one or more pallets toward the pick position 28. In the raised position, the stop 30 projects above the rollers 36 at that location in order to engage and stop movement of the pallet; and in the lowered position is at or below the rollers 36 at that location in order to allow gravitational conveying of the pallet.

As shown, the stop engages a forward facing face of a pallet in the build position. Alternatively, the stop 30 can be positioned to be under the pallet in the build position and to lift the pallet to a position generally parallel or even reverse slanted toward the aisle so that a pallet in the build position will not gravitationally travel along the conveyor.

Preferably, the control 32 comprises a remote controller 82 (e.g. a transmitter 84) and a receiver 86. The transmitter 82 can be positioned in the lift vehicle 60 operating in the aisle 18 so that the operator thereof who is creating the rainbow pallets 54 (or other custom pallets of select number of goods) can release those when built/ready according to an order. In particular, the operator of the lift vehicle 60 can push a button 88 on the transmitter 84 that signals the receiver 86 positioned proximate the stop actuator 80, and that activates the stop actuator 80 in order to lower the stop 30 for a given period of time in order to allow release of the rainbow pallet 54 (or other custom pallet of select number of goods) at the build position 26.

Accordingly, this provides spaced wireless communication with the actuator 80 to wirelessly operate the stop 30.

The control 32 may also include a proximity sensor 90 activating an operability of the remote controller 82 when a lift vehicle 60 is in a proximal position to the conveyor 24 of reverse lanes; and deactivating the operability of the remote controller 82 when the lift vehicle is outside of the proximal position. For example, each of the reverse lanes 22 may have a proximity sensor 90 sensing if the lift vehicle 60 is in a position in front of the desired forward lane 60, or alternatively, the lift vehicle 60 can have a proximity sensor (e.g. integrated into the device providing the transmitter 84) indicating its proximity to the receiver 86/actuator 80 for that selected lane.

In this manner, the remote controller 82 is operable for only one of the reverse lanes 22 at a time, and further when the lift vehicle 60 is not in an aisle position in front of a reverse lane 22, the stop 30 remains in a raised position keeping the pallet in the build position.

Only when the lift vehicle 60 is in front of a selected one of the reverse lanes 22 is the remote controller operable. Accordingly, when there are multiple reverse lanes 22 as shown, the remote controller will only operate that actuator 80 for the reverse lane (see lane 22a of FIG. 1) for which the lift vehicle 60 is currently positioned in front of. This feature has the benefit of when an operator of the lift vehicle 60 has completed an order of a rainbow pallet 54 (or other custom pallet of select number of goods), his lift vehicle 60 is currently in front of that respective reverse lane 22a and activating the button 88 on the transmitter 84 in the operator cab of the lift vehicle 60 will only activate the actuator 80 and lower the stop 30 for only that reverse lane 22a and not other reverse lanes designated 22b-22d in FIG. 1 (for which an empty pallet or partially built pallet of goods may be). Thus, inadvertent release of empty pallets or partially built pallets of goods at other reverse lanes is avoided.

As will be appreciated, when the lift vehicle 60 moves from the position shown in FIG. 1 to a position in front of lane 22b, then activating the button 88 on the transmitter 84 in the operator cab of the lift vehicle 60 will only activate the actuator 80 and lower the stop 30 for only that reverse lane 22b and not other reverse lanes designated 22a, 22c and 22d in FIG. 1.

The remote controller is akin to operating like a garage door opener by activating the select lane desired but not other lanes. In this manner, each lane could alternatively have separately designated activation buttons on the transmitter 84.

Various wireless remote control signaling technologies may be used for the overall control 32, including: infrared, which may or may not need a direct line of sight, and/or others that may not require a direct line of sight or others that do such as RF (radio frequency), ultrasonic pulses, wi-fi, blue-tooth or others. In the case of a direct line of sight such as an infrared example, the direct line of sight arrangement provides the proximity sensor 90 as between the transmitter and the receiver. Various IR remote controls may also not need a direct line of sight and are designed to send infrared light waves to the IR photodiodes of the device (these signals can pass through some solid objects, thinner walls). In the case of other examples, relative strength of signal can provide the proximity sensor 90, or other physical proximity sensors between the lift vehicle and the lift vehicle location to switch channels can be done, in which each different reverse lane has a different channel, and different frequencies used for different lanes. Accordingly, the term "proximity sensor" is meant to have a broad meaning.

Additionally, a visual indicator 92 is responsive to the proximity sensor 90 (regardless of whether the button 88 is pushed) providing to the operator of the lift vehicle 60 an indication when the lift vehicle 60 is in the proximal position to a desired respective reverse lane 22, allowing operation of the respective stop 30, therefore. For example, each reverse lane 22 includes its own respective visual indicator light 94 (and/or other signal indicator such as a speaker). The indicator light can flash green when lift vehicle 60 is in a proximal position to enable remote activation of the respective stop 30 via remote controller 82, and red which in a distal position indicating that the remote controller 82 is currently not operable for that lane because the lift vehicle 60 is not in a proximal position.

For example, in the condition shown in FIG. 1, the visual indicator light 94 of lane 22a is flashing green (indicating the control 32 is currently active for that lane 22a, but not other lanes 22b-22d, for which the indicator lights 94 of those lanes are flashing red indicating that pushing the button will not release the pallet at those lanes).

Similarly, when the lift vehicle 60 moves to a position in front of reverse lane 22b, then the indicator lights 94 of lane 22b becomes green indicating the control 32 is now active for lane 22b (allowing activation of the stop thereat to release pallets from the build station in lane 22b); and also now lane 22a becomes inactive (i.e. the control 32 is not currently active for that lane) and the visual indicator light 94 turns to red for lane 22a (lanes 22c and 22d also remaining inactive and red until the lift vehicle 60 moves to a proximal position in front of each respective lane).

With this pallet build system 10, an efficient method of building palleted goods is provided. With reference to FIG. 1, and the build conveyor 24 shown alone in FIGS. 11a-11f, it can be seen that the method involves: (a) placing and holding the pallet 14 at a build position 26 of the build conveyor 24; (b) stacking goods 12 (e.g. selected from goods 12a-12d shown in FIG. 1) on the pallet at the build position; (c) releasing the pallet from the build position with the stacked goods thereon (e.g. completed rainbow pallet 54 of goods); (d) conveying the pallet (e.g. rainbow pallet 54) on the build conveyor 24a with the stacked goods thereon to a pick position 28a; and picking the pallet with the stacked goods thereon (e.g. completed rainbow pallet 54 of goods) from the pick position 29.

The picking of pallets can be seen with reference to FIG. 11a whereby one or more rainbow pallets have been removed and the build conveyor is ready for building more rainbow pallets (e.g. transitioning from condition shown FIGS. 11d-f with a rainbow pallet ready to be picked to that of FIG. 11a). The picking is preferably done with a separate lift vehicle 72 as noted above, but may also be accomplished with robotic arm, transfer to another conveyor or other removal device for further processing and/or delivery to a customer.

The method also comprises stocking goods to be used to stack the goods on the pallet at the build position, using the arrangement of forward lanes 20 and one or more reverse lanes 22 relative to an aisle 18 as shown in FIG. 1 and with additional reference to FIGS. 10a-10f. The method is further accomplished by transporting stock goods 12 toward the aisle in the forward lanes to stock grab positions 44 (e.g. from stock load positions 42 that can be replenished as noted above); selecting from the stock goods 12a, 12b, 12c, 12d from the stock grab positions (e.g. typically entire layers of stock goods at the stock grab positions 44) to use for stacking (e.g. to form layers of stacked goods) on the pallet 12 in the build position 26, and transporting the stacked goods (e.g. completed rainbow pallet 54 of goods) away from the aisle 18 toward the pick position 28 on the rainbow pallet.

The method further can involve operating the lift vehicle 60 in the aisle to facilitate transfer of stock goods from stock grab positions on the various forward lanes 20 to the build position 26 in one or more reverse lanes 22.

If at least two reverse lanes are provided such as is shown in FIGS. 1 and 2, and the lift vehicle 60 operated in the aisle 18 to select and move goods 12 from the forward lanes 20 to the reverse lanes 22, the method can further comprise remotely controlling from the lift vehicle 60 (e.g. operator cab thereof) the releasing of the stacked goods (e.g. completed rainbow pallet 54 of goods) on the at least two reverse lanes 22 with the remote controller.

It is further provided that proximity sensing features are providing, by automatically enabling the remote controller 82 for only one of the reverse lanes at a time depending upon relative proximity of the remote controller 82 to the respective reverse lanes 22, whereby the releasing is only done on one of the reverses lanes 22 at a time to avoid inadvertent release on a different one of the reverse lanes 22. For example, in FIG. 1 with the lift vehicle 60 in currently front of reverse lane 22a but not currently in front of reverse lanes 22b-22d the remote controller 82 is activated for only reverse lane 22a but not reverse lanes 22b-22d which feature can be provided either on the transmitter or receiver portion (e.g. for example, the proximity sensor 90 may trigger an on/off switch between the receiver 86 and the stop actuator 80). When the lift vehicle 60 moves now becomes currently in front of reverse lane 22c but not currently in front of reverse lane 22a the remote controller 82 is enabled and activated for only reverse lane 22c.

The methods discussed are particularly advantageous with gravitational feeding in the pallet build system 10 to avoid/reduce the need for driving movements. As shown via FIGS. 1, 10a-10f, 11a-11f, the method involves gravitationally feeding pallets 14 of stock goods 12 in the forward lanes 20 toward the aisle 18; and gravitationally feeding pallets 14 of stacked goods 12 away from the aisle 18 with at least one reverse lane 22.

When a gravitational feed conveyor is used with the pick position 44 is vertically below the build position 24, the operable stop 30 arranged at the build position facilitates keeping the pallet 12 at the build position 24 thereby maintaining the pallet 12 in a holding status at the build position for stacking goods thereon as may be desired. Preferably, the stop is in a normally raised stopping state (e.g. spring loaded upward) so that stopping movement is the normal state (for in case of power loss). Using the control 32 (preferably via remote controller 82), the stop 30 can be actuated via actuator 80 to the disengaged lower state thereby releasing the stop 30 to facilitate automatic gravitational feeding of the pallet from the build position to the pick position. The system 10 automatically stops the gravitational feeding at the end stop 70 at the lower pick position 28.

With a person operating the lift vehicle 60, for example with the remote controller 82 discussed above, that vehicle operator can then selectively control release of the pallet from the build position 26 from the lift vehicle as is demonstrated in FIGS. 1-3, for example with a button 88 operated transmitter 84 on the lift vehicle 60.

Further, the visual indicator 92 is usable to facilitate signaling to the operator of the lift vehicle 60 whether the lift vehicle 60 is in the proximal position or outside of the proximal position relative to a selected build conveyor 24.

As apparent, the pallet build system 10 facilitates the selective picking of goods 12 from a plurality of different stock goods 12a. 12b, 12c, 12d to stack upon the pallet 14 at the build position; with the stock goods located in different stock grab positions 44 spaced away from the build position 26. For example, the different stock goods 12a, 12b, 12c, 12d are on respective pallets 14 on respective stock conveyors 40.

Further, the pallet build system 10 facilitates rainbow pallet 54 creation (e.g. mixed SKU goods built on a pallet), wherein the different stock goods 12a, 12b, 12c, 12d being of different product characteristic (e.g. in the example of soda-lemon/lime, root beer, soda, diet) having respectively different unique codes (e.g. SKU, but also UPC or others). Preferably, the rainbow pallets are most efficiently stratified in layers with a clamp pick tool 64 pick entire layers of goods the rectangular size of the pallet and place it in one or more distinct layers on the rainbow pallet 54. Further, the method creates differently configured rainbow pallets 54 of different goods (e.g. different layers of goods) have respectively different unique codes at the build position (either at the same build position or different build positions of different reverse lanes 22).

Turning to FIGS. 12-16, different operating circuits are shown for the control 32 in order to switch the actuator 80 (or 80a, 80b, 80c) between hold and release states at the build position 26. A worker (either on a lift vehicle, at some other remote spot or even at a local non-remote location) can use the control 32 (e.g., remote controllers 82) to operate the actuator 80 to switch the stop 30 between a hold state for holding the at least one pallet in the build position 26 and a release state for releasing the at least one pallet from the build position 26. Thus, and as apparent from the discussion of FIGS. 1-11 this is mere on/off operation, and the control may be understood as an on/off switch.

The actuator can be driven to raise and lower the stop 30 to (a) a raised position that is adapted to hold one or more pallets in the build position and (b) a lowered position that is adapted to allow gravitational feeding of one or more pallets toward the pick position. For example, schematic arrows indicating the movement for the stop 30 are shown in FIG. 12-15.

Figure 12:
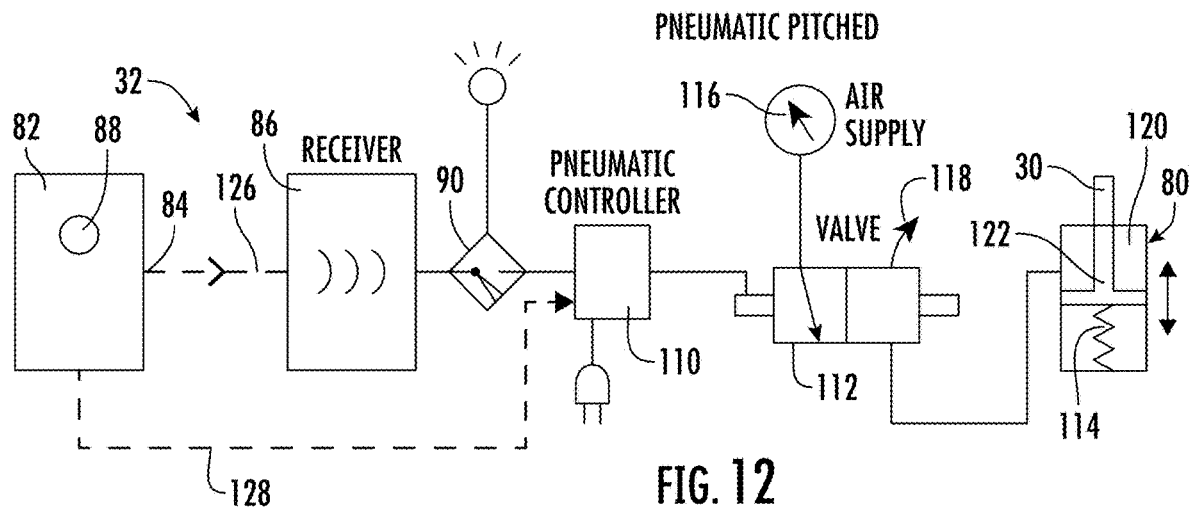
FIG. 12 is a schematic diagram of a pneumatic actuator circuit for operating the stop according to an embodiment.
Figure 13:
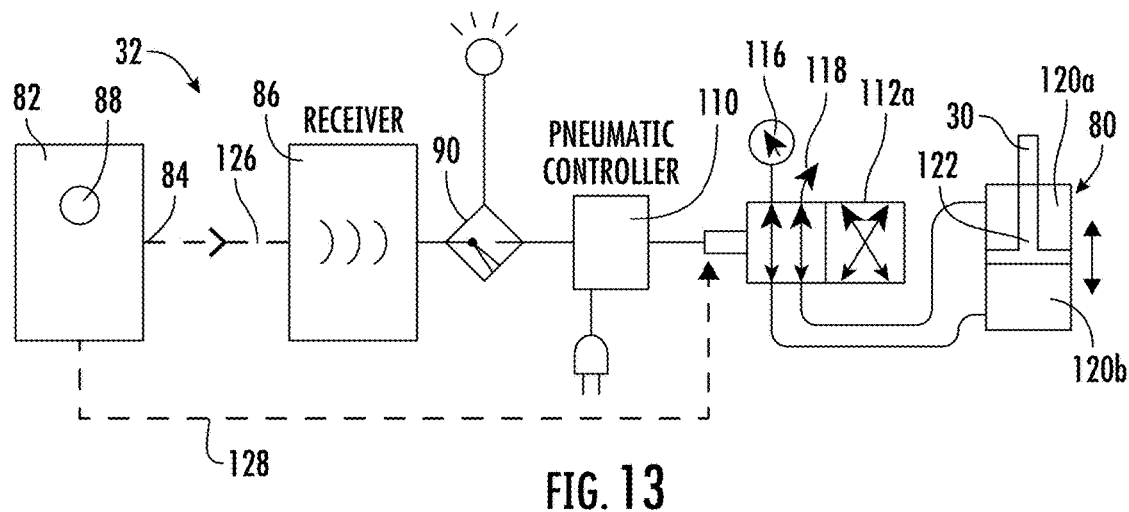
FIG. 13 is a schematic diagram of another pneumatic actuator circuit for operating the stop according to a further embodiment.
Figure 14:
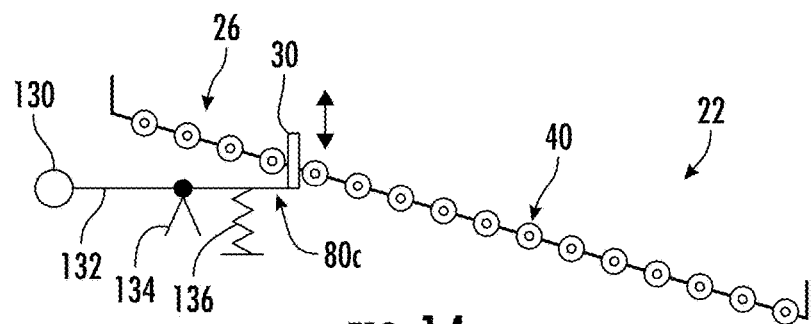
FIG. 14 is a schematic diagram of mechanic actuator circuit for operating the stop according to a further embodiment.

In some embodiments as shown in FIGS. 12-13, the actuator is a fluid actuator 80, with the control 32 switching the actuator 80 between the hold and release states (for example between different extended and contracted positions). The control 32 can comprise a fluid control (e.g., pneumatic controller 110 operating a solenoid valve 112*a* or 112*b*) to control fluid flow to fluid actuator 80 in order to raise and lower the stop 30.

In FIG. 12, the actuator 80 is biased such as via a spring 114 (or weight or the like) to the hold state. The pneumatic controller 110 can be activated by the remote controller 82 when a worker triggers the same such through the push button 88, sending a actuator control signal wirelessly through transmitter 84 to receiver 86, which is then transmitted to the pneumatic controller 110 through the proximity sensor 90. As discussed above the proximity sensor 90 switches on and off to allow actuation or not for that reverse lane 22 and build conveyor 24 depending upon whether the lift vehicle and/or remote controller is proximate and/or in sensory communication with that that reverse lane 22 and build conveyor 24. If so the proximity sensor 90 completes that circuit.

For example, as schematically shown, the proximity sensor 90 can switch the electrical connection on or off between the receiver and the pneumatic controller 110, and/or alternatively as discussed above, different channels may be used and/or the receiver may be simply switched on or off. As discussed, the proximity sensor 90 also has a visual indicator 92 such as a light indicating its status. For example, a red light indicates the switch is open and the actuator not currently active and green light indicates the switch is closed, and the actuator is now active.

When actuator control signal is communicated to the pneumatic controller 110, the pneumatic controller 110 will operate the solenoid valve 112. The pneumatic controller 111 will activate the solenoid valve 112 for as long as the operator pushes the button and/or more typically for a predetermined time such as 10 seconds to allow enough time for a pallet at the build position 26 to exit therefrom (yet even further alternative, a closed loop could be done in which a proximity sensor at the build position 26 provides feedback to the pneumatic controller 110 indicating when the pallet has left the build station so that the solenoid valve 112 no longer needs to be activated).

As shown, in this case the solenoid valve 112 switches between a pressurized air supply 116 and an exhaust vent 118. When control signal is communicated to the pneumatic controller 110, pneumatic controller 110 activates the solenoid valve 112 which communicates pressurized air from air supply 116 to a chamber 120 which pressurized fluid then acts upon piston 122 and drives the piston and stop at the end of the piston rod thereof thereby lowering the stop 30 to the release state. In the release state, pallets at the build station can be released. Once the pallet has left the build position 26 and is gravitationally feeding and/or moving toward the pick position 28, the pneumatic controller 110 no longer activates the solenoid valve 112 which then switches back connecting the actuator chamber 120 to the exhaust vent 118 causing the stop 30 to raise back up to stop the next pallet placed there.

In FIG. 13, the same arrangement as FIG. 12 is indicated and the description above to FIG. 1-12 applicable hereto. In FIG. 13, it is shown other forms of pneumatic operation can be done, for example, with actuator 80 that may not be biased by a spring 114, but instead chambers 120*a* and 120*b* are alternatively connected to the air supply 116 and exhaust vent 118 to be alternatively pressurized and exhausted to raise and lower the stop 30 via a valve 112*a* that switches fluid line connections two connections simultaneously to the chambers 120*a* and 120*b*. The same pneumatic controller 110 as discussed above applies.

Figure 15:
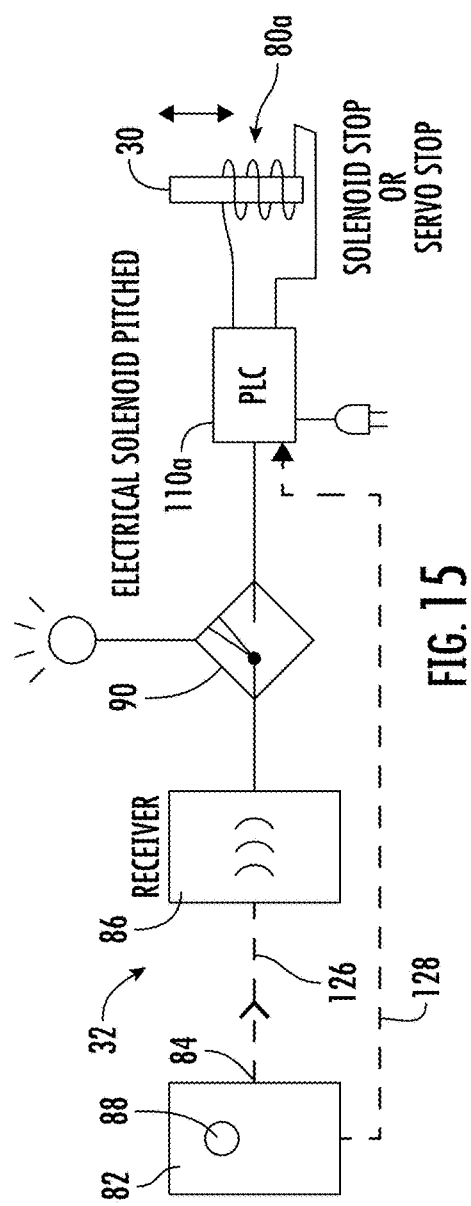
FIG. 15 is a schematic diagram of an electrical circuit for operating the stop according to a further embodiment.

In FIG. 15, the same arrangement as FIGS. 12-13 is indicated and the description above to FIG. 1-12 applicable hereto, except as otherwise indicated below, and in particular that an electrical actuation circuit is shown for an electrical actuator 80*a* for the stop 30. In this embodiment, the actuator control signal is communicated via the remote controller 82 and through the proximity sensor 90 as previously discussed and show to a programable logic controller 110*a* (or microprocess and/or on/off switch) that operates the electrical actuator 80*a* so long as the worker presses the button 88 or for a predetermined time once activated by the programable logic controller 110*a* (or that can also be closed loop with proximity sensor feedback at the build position). The electrical actuator 110*a* can be linear motor such as solenoid or servo actuator, or a rotary electrical motor that raises and lowers the stop 30 between the hold state and the release state to either hold pallet(s) at the build station or release the pallet(s) therefrom.

In FIG. 15, the same arrangement as FIGS. 12-13 is indicated and the description above to FIG. 1-12 applicable hereto, except as otherwise indicated below. In particular, an electrical actuation circuit is shown for an electrical actuator 80*a* for the stop 30. In this embodiment, the actuator control signal is communicated via the remote controller 82 and through the proximity sensor 90 as previously discussed and to a programable logic controller 110*a* (or microprocess and/or on/off switch). The programable logic controller 110*a* operates the electrical actuator 80*a* so long as the worker presses the button 88 or for a predetermined time once activated by the programable logic controller 110*a* (or that can also be closed loop with proximity sensor feedback at the build position). The electrical actuator 80*a* can be linear motor such as solenoid or servo actuator, or a rotary electrical motor that raises and lowers the stop 30 between the hold state and the release state to either hold pallet(s) at the build station or release the pallet(s) therefrom.

The stop 30 may be provided by a lift and/or abutment projection as apparent from the above in FIGS. 1-15. The stop can either abut a forward facing edge of the at least one pallet or may at least partially raises the at least one pallet from the conveyor when it is a gravitational conveyor in the hold state, or can also be a frictional brake that acts upon the pallet and/or rollers 50.

Figure 16:
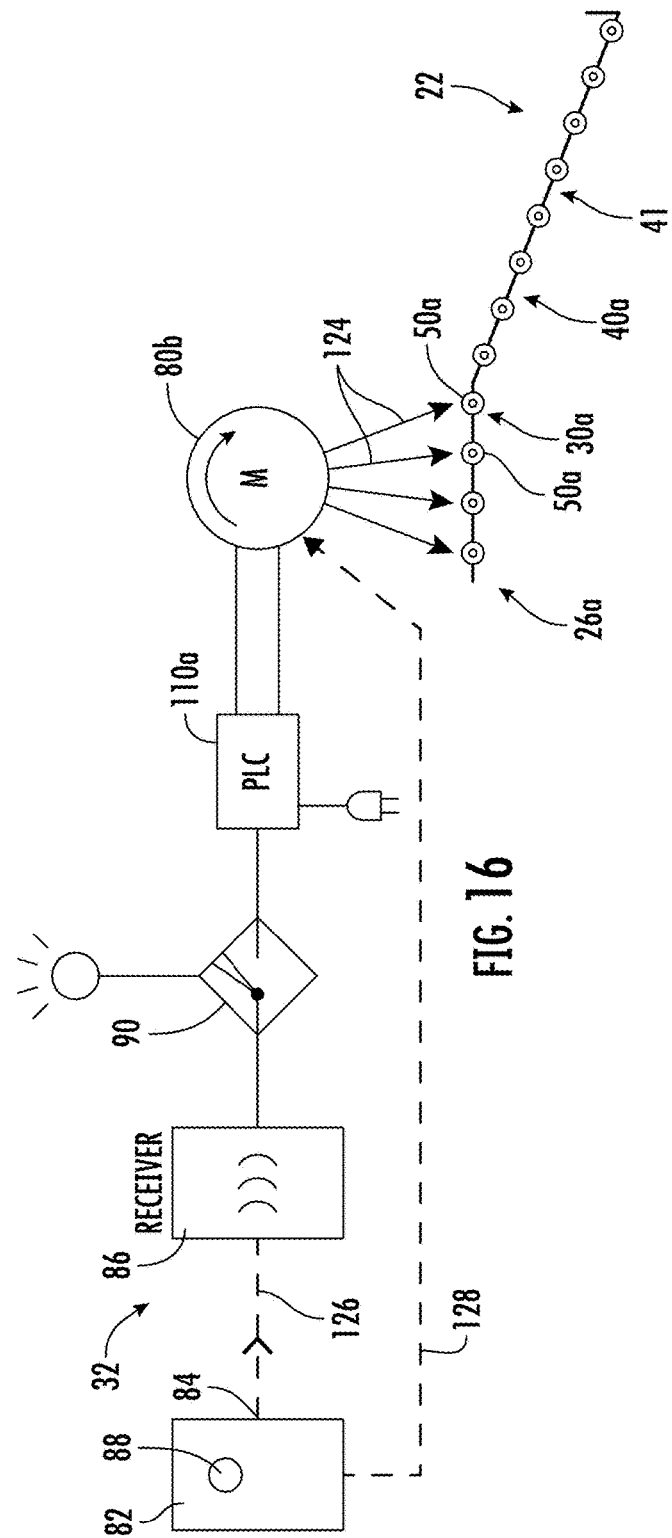
FIG. 16 is schematic diagram of another electrical circuit for operating a stop according to a further embodiment, in which the stop takes the form of intermittently driven rollers at the build station.

However, in some embodiments, the stop takes other forms. For example, as shown in FIG. 16, the stop can be at least driven roller 50*a* at the build position 26*a* that engages with a pallet at the build position 26*a*. The at least one driven roller 50*a* serves as the stop 30*a* at the build position 26*a*.

In FIG. 16, the same control arrangement as in FIG. 15 (and/or FIGS. 12-13) is otherwise provide and the description above to FIGS. 1-13 and 15 is applicable hereto, except as otherwise indicated. In this embodiment, rather than raising and lowering a stop, the actuator is a rotary actuator 80*b* (e.g., electrical rotary motor but also could fluid powered rotary motor), that acts through a drive 124 (e.g. chain and sprocket, belt or direct) to the driven rollers 50*a*. The driven rollers 50*a* may be frictionally braking and stopping pallets in a complete gravitational conveyor arrangement in an embodiment such that the same gravitational feed conveyor 40 as earlier embodiments may be used, but more preferably the build position 26*a* can be modified and flat (and/or inclined less or ever reverse inclined) such that pallets and goods stay at the build position 26*a* naturally. However, the remainder downstream section 41 of the conveyor 40*a* may be a gravitational feed conveyor like the conveyor 40 which may be non-driven rollers 50.

The control in FIG. 16 again is otherwise the same as that for other embodiments of FIGS. 1-12, 13 and 15. For example, in FIG. 16 the actuator control signal can communicated via the remote controller 82 and through the proximity sensor 90 as previously discussed and to a programable logic controller 110*a* (or microprocess and/or on/off switch). The programmable logic controller 110*a* operates the electrical actuator 80*a* so long as the worker presses the button 88 or for a predetermined time once activated by the programable logic controller 110*a* (or that can also be closed loop with proximity sensor feedback at the build position). The electrical actuator 80*b* here is a rotary electrical motor that maintains the driven rollers 50*a* stationary in the hold state (e.g., does not drive the rollers) and drives the rollers 50*a* via the drive 124 in the release state, respectively to either hold pallet(s) at the build station or release the pallet(s) therefrom.

In FIGS. 1-13, and 15-16, remote control is shown via remote controller 82 that acts through a wireless communication 126 shown schematically in FIGS. 13, 15-16. This is preferred in that remote operation from the cab of a lift vehicle (or even at a remote control station) as discussed in FIGS. 1-12 is provided.

In other embodiments, the control can be local in which the remote controller 82 is operated locally. Also, hard wired communication can be done in embodiments, with push button 88 of the controller 82 in hardwired communication with the pneumatic controller 110 and/or solenoid valve 112 in FIGS. 12-13 via a wire 128 (shown as an optional hard electrical wire in FIG. 12, 13); and/or with the controller 82 in hardwired communication with the PLC 110*a* 110 or directly the electrical actuator 80*a*, 80*b* in FIGS. 14-16 via a wire 128 as an option (e.g. the remote controller 82 can be hard wired if desired as well).

Additionally, rather than a soled valve 112 and fluid controller 110*a* the control 32 rather than employing controller 82 can simply be a manually operated fluid control lever to alternatively engage or disengage the fluid powered actuator 80 (and/or hydraulics can be used as an alternative to pneumatics).

Different types of actuators may also be used as apparent from the above. As a further example, in FIG. 14, another embodiment is shown in which the control is in the form of handle 130 that drives a mechanical actuator 80*c* such as a lever 132 about a fulcrum 134 (a pulley, rack pinion/gear, etc. may be employed as mechanical actuator). The lever has the stop 30 at an end thereof that like other embodiment is a projection that can be raised to act upon a pallet at the build position 26 and keep the pallet thereat for building a customized pallet of goods. As shown, a spring 136 (or weight) provides a biasing force to maintain the stop 30 in the hold state. The stop may have a normally raised condition maintaining the hold state such as with a weight, spring or the like. A worker at the conveyor can selectively trigger such control (e.g. push a lever) to release the stop, or even a worker in the lift vehicle can do it remotely while in the cab either through location and/or using the vehicle and/or operated forks of the lift vehicle. For example, lifting the handle 130 will lower the stop 30 against the action of the spring and allow release of the pallet at the build position 26. In this embodiment the gravitational feed conveyor 40 as the build conveyor 24 may be used.

Any of these control and actuator embodiments described above and particularly for FIGS. 12-16 can be employed as the one or more build conveyors 24 shown in FIGS. 1-11.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pallet build system for stacking goods upon pallets, comprising:
   a plurality of conveyor lanes located on at least one side of an aisle, the conveyor lanes including forward lanes and at least one reverse lane, each conveyor lane adapted to hold at least one of the pallets and the goods thereon that are moveable toward the aisle in the forward lanes and away from the aisle in the at least one reverse lane;
   wherein the forward lanes comprise stock conveyors having respective stock grab positions arranged along the aisle, the respective stock grab positions positioned outside of the aisle for allowing vehicle movement within the aisle;

each at least one reverse lane comprising:
(a) a build conveyor having spaced apart build and pick positions the build position along the aisle and the pick position distal from the aisle, the build conveyor positioned outside of the aisle for allowing vehicle movement within the aisle transversely between different stock grab positions;
(b) a stop arranged to hold at least one pallet in the build position, the stop operable to allow movement of at least one pallet on the build conveyor from the build position in a direction away from the aisle to the pick position.

2. The pallet build system of claim 1, wherein conveyor lanes are located on both sides of the aisle, and further comprising a lift vehicle operating in the aisle.

3. The pallet build system of claim 2, wherein at least three conveyor lanes are located a first side of the aisle and at least three conveyor lanes are located a second side of the aisle opposite the first side.

4. The pallet build system of claim 1, further comprising:
a lift vehicle operable in the aisle to select and move goods from the forward lanes to the at least one reverse lane.

5. The pallet build system of claim 4, further comprising clamp layer pick tool on the lift vehicle operable to selectively stack goods on at least one of the pallets in the build position.

6. The pallet build system of claim 5 wherein the stock conveyors comprise gravitational feed conveyors that extends at an angle relative horizontal of between 3 and 20 degrees, tilted downwardly toward the aisle so as to gravitationally feed pallets toward the aisle.

7. The pallet build system of claim 4, further comprising a second lift vehicle spaced from said lift vehicle operable to remove one or more pallets of stacked goods from the pick position on the at least one reverse lane.

8. The pallet build system of claim 1, further comprising:
different stock goods stored on respective pallets on respective members of the stock conveyors in different respective forward lanes, wherein the different stock goods being of different product characteristics having respectively different unique codes; and
a rainbow pallet of goods of different product characteristics having respectively different unique codes selected from the different stock goods are built at the build position.

9. The pallet build system of claim 1 wherein the build conveyor of each at least one reverse lane is a gravitational feed conveyor with the pick position disposed below the build position, wherein the gravitational feed conveyor comprises a pair of rails and a plurality of rollers extending between the rails, and wherein the gravitational feed conveyor extends at an angle relative horizontal of between 3 and 20 degrees between pick position and the build position.

10. The pallet build system of claim 1, further comprising a control and an actuator, the control operating the actuator to switch the stop between a hold state for holding the at least one pallet in the build position and a release state for releasing the at least one pallet from the build position.

11. The pallet build system of claim 10, wherein the actuator can be driven to raise and lower the stop to (a) a raised position adapted to hold one or more pallets in the build position and to (b) a lowered position adapted to allow gravitational feeding of one or more pallets toward the pick position.

12. The pallet build system of claim 11, wherein the actuator is a fluid actuator, the control switching the actuator, the control comprising a fluid controller operating a valve to control fluid flow to fluid actuator in order to raise and lower the stop.

13. The pallet build system of claim 11, wherein the actuator is an electrical actuator, the control including programable logic controller or microprocessor switching the electrical actuator in order to raise and lower the stop.

14. The pallet build system of claim 11, wherein the stop either abuts a forward facing edge of the at least one pallet or at least partially raises the at least one pallet from the build conveyor in the hold state.

15. The pallet build system of claim 10, wherein at least one driven roller is provided at the build position that engages with the at least one pallet, wherein the at least one driven roller serves as the stop at the build position, the actuator driving the at least one driven roller in the release state to release the at least one pallet from the build position and holding the at least one driven roller in the hold state to maintain the at least one pallet at the build position.

16. A pallet build system for stacking goods upon pallets, comprising:
a plurality of conveyor lanes located on at least one side of an aisle, the conveyor lanes including forward lanes and at least one reverse lane, each conveyor lane adapted to hold at least one of the pallets and the goods thereon that are moveable toward the aisle in the forward lanes and away from the aisle in the at least one reverse lane;
each at least one reverse lane comprising:
(a) a conveyor having spaced apart build and pick positions;
(b) a stop arranged to hold at least one pallet in the build position, the stop operable to allow movement of at least one pallet on the conveyor from the build position to the pick position;
a lift vehicle operable in the aisle to select and move goods from the forward lanes to the at least one reverse lane; and
a remote controller including a transmitter, the transmitter communicating with a receiver, the transmitter positioned on the lift vehicle and the receiver in communication with an actuator for the stop, wherein the remote controller is operable to activate the stop to release at least one pallet in the build position to allow travel toward the pick position.

17. The pallet build system of claim 16, wherein at least two reverse lanes are provided, and wherein the remote controller is operable to activate respective stops on respective conveyors of the at least two reverse lanes, and further comprising a proximity sensor indicating position of the lift vehicle relative to the reverse lanes communicating with the remote controller and/or respective actuator controls for the respective stops in a manner that activates the remote controller for only one of the reverse lanes at a time depending upon relative proximity of the remote controller to the respective reverse lanes so that only one of the respective stops is released at a time to avoid inadvertent pallet release on a different one of the reverse lanes.

18. A pallet build system for stacking goods upon pallets, comprising:
a plurality of conveyor lanes located on at least one side of an aisle, the conveyor lanes including forward lanes and at least one reverse lane, each conveyor lane adapted to hold at least one of the pallets and the goods thereon that are moveable toward the aisle in the forward lanes and away from the aisle in the at least one reverse lane;

each at least one reverse lane comprising:
(a) a conveyor having spaced apart build and pick positions;
(b) a stop arranged to hold at least one pallet in the build position, the stop operable to allow movement of at least one pallet on the conveyor from the build position to the pick position;
a control and an actuator, the control operating the actuator to switch the stop between a hold state for holding the at least one pallet in the build position and a release state for releasing the at least one pallet from the build position; and
wherein the control comprises a remote controller including a transmitter, the transmitter operable in spaced wireless communication with the actuator to wirelessly operate the stop.

19. The pallet build system of claim 18, further comprising a proximity sensor activating an operability of the remote controller when a lift vehicle is in a proximal position to the conveyor; and deactivating the operability of the remote controller when the lift vehicle is outside of the proximal position.

20. The pallet build system of claim 19, further comprising a visual indicator responsive to the proximity sensor providing an indication when the lift vehicle is in the proximal position, allowing operation of the stop.

21. A conveyor apparatus for building goods on a pallet using a lift vehicle operable to selectively stack goods on one or more pallets thereon, comprising:
a gravity feed conveyor having spaced apart build and pick positions;
a stop arranged to hold the pallet in the build position;
a remote controller operable to release the stop to allow movement of the pallet on the gravity feed conveyor from the build position to the pick position; and
wherein the remote controller has a position on the lift vehicle to allow operation of the stop remotely from the lift vehicle.

22. The conveyor apparatus of claim 21 wherein the remote controller is operable in spaced wireless communication with an actuator driving the stop to wirelessly operate the stop.

23. The conveyor apparatus of claim 22, wherein the actuator is a pneumatic actuator having an activated state lowering the stop to release the pallet from the build position and a deactivated state maintaining the stop in a raised position holding the pallet in the build position.

24. The conveyor apparatus of claim 21, wherein the lift vehicle has a clamp layer pick tool operable to selectively stack goods on one or more pallets in the build position; and usable with a second lift vehicle operable to remove one or more pallets of goods from the pick position.

25. The conveyor apparatus of claim 21, further comprising:
different stock goods stored on respective pallets in spaced relation to the gravity feed conveyor, wherein the different stock goods being of different product characteristics having respectively different unique codes; and
a rainbow pallet of goods of different product characteristics having respectively different unique codes selected from the different stock goods that are stacked at the build position.

26. A conveyor apparatus for building goods on a pallet, comprising:
a gravity feed conveyor having spaced apart build and pick positions;
a stop arranged to hold the pallet in the build position; and
a remote controller operable to release the stop to allow movement of the pallet on the gravity feed conveyor from the build position to the pick position;
wherein the remote controller is operable in spaced wireless communication with an actuator driving the stop to wirelessly operate the stop;
a proximity sensor activating an operability of the remote controller when a lift vehicle is in a proximal position to the conveyor; and deactivating the operability of the remote controller when the lift vehicle is outside of the proximal position.

27. The conveyor apparatus of claim 26, further comprising a visual indicator responsive to the proximity sensor providing an indication when the lift vehicle is in the proximal position, allowing operation of the stop.

* * * * *